(12) United States Patent
Guan et al.

(10) Patent No.: US 11,121,847 B2
(45) Date of Patent: Sep. 14, 2021

(54) COMMUNICATION METHOD AND COMMUNICATIONS DEVICE

(71) Applicant: HUAWEI TECHNOLOGIES CO., LTD., Guangdong (CN)

(72) Inventors: Peng Guan, Chengdu (CN); Xi Zhang, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 117 days.

(21) Appl. No.: 16/684,197

(22) Filed: Nov. 14, 2019

(65) Prior Publication Data

US 2020/0084009 A1 Mar. 12, 2020

Related U.S. Application Data

(63) Continuation of application No. PCT/CN2018/087542, filed on May 18, 2018.

(30) Foreign Application Priority Data

May 18, 2017 (CN) .......................... 201710354921.1

(51) Int. Cl.
*H04L 5/00* (2006.01)
*H04W 72/04* (2009.01)

(52) U.S. Cl.
CPC ......... *H04L 5/0082* (2013.01); *H04W 72/042* (2013.01); *H04W 72/0446* (2013.01); *H04W 72/0453* (2013.01)

(58) Field of Classification Search
CPC .............. H04L 5/0082; H04W 72/042; H04W 72/0446; H04W 72/0453
See application file for complete search history.

(56) References Cited

U.S. PATENT DOCUMENTS

| | | | |
|---|---|---|---|
| 2015/0256403 A1 | 9/2015 | Li et al. | |
| 2016/0360541 A1 | 12/2016 | Kim et al. | |
| 2017/0071010 A1 | 3/2017 | Lim et al. | |
| 2017/0135105 A1* | 5/2017 | Li | H04W 72/12 |
| 2017/0230977 A1 | 8/2017 | Shen et al. | |

(Continued)

FOREIGN PATENT DOCUMENTS

| | | |
|---|---|---|
| CN | 103716841 A | 4/2014 |
| CN | 104662978 A | 5/2015 |

(Continued)

OTHER PUBLICATIONS

Kittipong Kittichokechai et al., 'Improved Frequency Domain Resource Allocation Indication', IEEE, 2020, pp. 1-5. (Year: 2020).*

(Continued)

*Primary Examiner* — Melvin C Marcelo
(74) *Attorney, Agent, or Firm* — Fish & Richardson P.C.

(57) ABSTRACT

The present disclosure relates to communication methods and communications devices. In one example communication method, control information is sent to a terminal device. The control information includes a resource identifier. The resource identifier indicates that allocated frequency domain resources are all frequency domain resources that can be supported by the terminal device on one carrier or that some of all frequency domain resources that can be supported by the terminal device on one carrier.

20 Claims, 8 Drawing Sheets

| Field | Bit length |
|---|---|
| Resource allocation header Resource allocation header | 1 |
| Start symbol of a data channel | 2 |
| Symbol length occupied by the data channel | 2 |

(56) References Cited

U.S. PATENT DOCUMENTS

2018/0124804 A1   5/2018  Yao et al.
2018/0192409 A1   7/2018  Yang et al.

FOREIGN PATENT DOCUMENTS

| CN | 105099634 A | 11/2015 |
|---|---|---|
| CN | 105472528 A | 4/2016 |
| CN | 106162906 A | 11/2016 |
| CN | 106332286 A | 1/2017 |
| CN | 106455103 A | 2/2017 |
| CN | 106612557 A | 5/2017 |
| JP | 2015053715 A | 3/2015 |
| WO | 2015113295 A1 | 8/2015 |

OTHER PUBLICATIONS

Office Action issued in Chinese Application No. 201710354921.1 dated Mar. 29, 2021, 9 pages.
Extended European Search Report and Written Opinion issued in European Application No. 18801707. dated Apr. 2, 2020, 8 pages.
3GPP TS 36.212 V13.0.0 (Dec. 2015), "3rd Generation Partnership Project;Technical Specification Group Radio Access Network; Evolved Universal Terrestrial Radio Access (E-UTRA); Multiplexing and channel coding (Release 13)," Dec. 2015, 121 pages.
3GPP TS 36.213 V13.0.0 (Dec. 2015), "3rd Generation Partnership Project; Technical Specification Group Radio Access Network; Evolved Universal Terrestrial Radio Access (E-UTRA); Physical layer procedures (Release 13)," Dec. 2015, 326 pages.
PCT International Search Report and Written Opinion issued in International Application No. PCT/CN2018/087542 dated Aug. 3, 2018, 19 pages (with English translation).

* cited by examiner

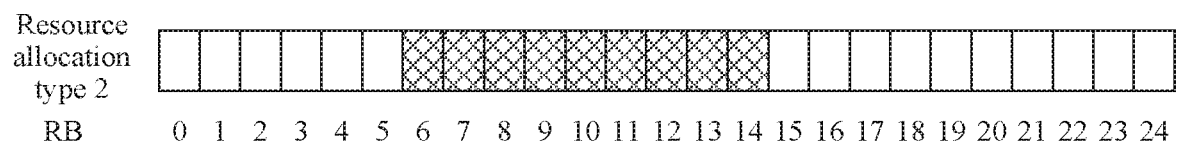
FIG. 1(c)
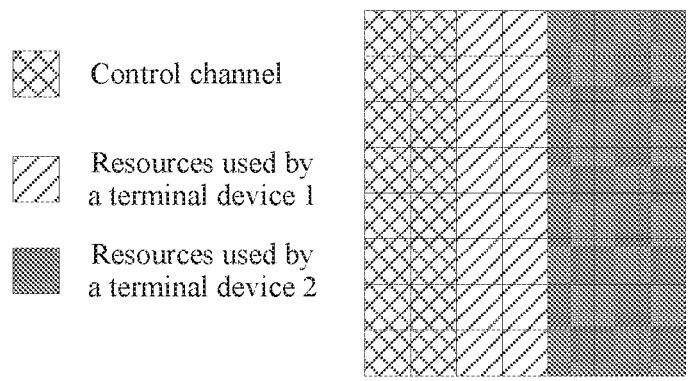
FIG. 2
| Field | Bit length |
|---|---|
| Resource allocation header Resource allocation header | 1 |
| Start symbol of a data channel | 2 |
| Symbol length occupied by the data channel | 2 |
FIG. 3(a)
| Field | Bit length |
|---|---|
| Resource allocation header Resource allocation header | 1 |
FIG. 3(b)

| Field | Bit length |
|---|---|
| Resource allocation header Resource allocation header | 1 |
| Offset Offset | 2 |

| Field | Bit length |
|---|---|
| Resource allocation header Resource allocation header | 1 |
| Redundancy version Redundancy version RV | 2 |

| Field | Bit length |
|---|---|
| Resource allocation header Resource allocation header | 1 |
| HARQ process number HARQ process number | 3 |

| Field | Bit length |
|---|---|
| Resource allocation header Resource allocation header | 1 |
| New data indication New data indication | 1 |
FIG. 6(c)
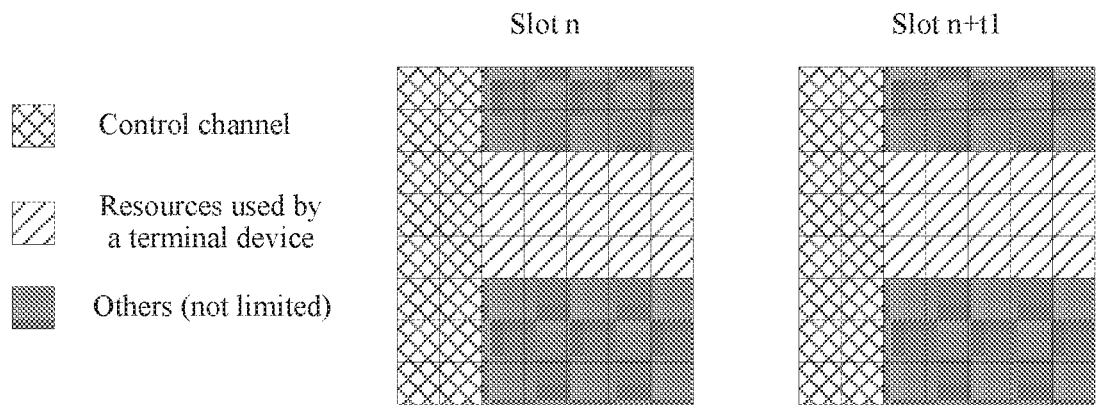
FIG. 7
| Field | Bit length |
|---|---|
| Resource allocation header Resource allocation header | 1 |
FIG. 8
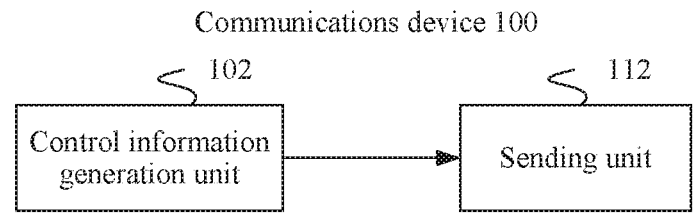
FIG. 9

COMMUNICATION METHOD AND COMMUNICATIONS DEVICE

CROSS-REFERENCE TO RELATED APPLICATIONS

This application is a continuation of International Application No. PCT/CN2018/087542, filed on May 18, 2018 which claims priority to Chinese Patent Application No. 201710354921.1, filed on May 18, 2017, The disclosures of the aforementioned applications are hereby incorporated by reference in their entireties.

TECHNICAL FIELD

This application relates to the field of communications technologies, and in particular, to a communication method and a communications device in a wireless communications system.

BACKGROUND

In a communications system, downlink communication means that a base station sends information to a terminal device, and uplink communication means that the terminal device sends information to the base station. Downlink communication includes but is not limited to sending downlink data to the terminal device by the base station, and uplink communication includes but is not limited to sending uplink data to the base station by the terminal device. Before transmitting downlink data, the base station needs to send downlink control information (Downlink Control Information, DCI) to the terminal device, to instruct the terminal device to receive data. After performing a series of operations such as channel coding, the base station adds the DCI to a physical downlink control channel (Physical downlink control channel, PDCCH), and sends the DCI to the terminal device. In addition, if the terminal device needs to transmit uplink data to the base station, the base station needs to grant the terminal device how to perform uplink transmission. This grant is also notified to the terminal device by using the DCI.

Because the control information is extremely important, the control information is usually transmitted by using a relatively low bit rate and a low-order modulation scheme, to ensure robustness of the control information. A bit rate is usually a proportion of valid information bits in transmission bits. For example, 20-bit information is coded into 60-bit information, and a bit rate is 1/3. A lower bit rate indicates stronger protection and error correction capabilities that can be provided by channel coding. Modulation means modulating bits into a symbol. For example, for a quadrature phase shift keying (quadrature phase shift keying, QPSK) symbol, 2 bits are modulated into one QPSK symbol through modulation; and for a 256 quadrature amplitude modulation (quadrature amplitude modulation, QAM) symbol, 8 bits are modulated into one 256 QAM symbol through modulation. A lower modulation order indicates a smaller transmission error probability.

In communication, a symbol is usually mapped to a basic time-frequency resource unit. Time-frequency resources required for sending the DCI by the base station are directly proportional to a length of the DCI, that is, DCI of a longer length occupies more time-frequency resources. However, there are limited time-frequency resources on a control channel, and most of the time-frequency resources need to be reserved for data transfer. In the prior art, information that is included in the DCI and that is used to indicate resources allocated to the terminal device has an excessively long length, and occupies an excessively large quantity of bits. Consequently, a relatively large quantity of time-frequency resources are occupied because resource allocation information is indicated.

SUMMARY

Embodiments of this application provide a communication method and a communications device in a wireless communications system, to reduce time-frequency resources occupied by resource allocation information.

According to a first aspect, an embodiment of this application provides a communication method, including:

allocating communication resources to a terminal device; and sending control information to the terminal device, where the control information includes a resource identifier, and the resource identifier is used to indicate that allocated frequency domain resources are all frequency domain resources that can be allocated by a base station.

In the method, the allocated frequency domain resources are indicated by using the resource identifier in the control information. Because the identifier occupies a small quantity of bits, bits occupied by information about allocated resources can be reduced, and time-frequency resources occupied because the allocated frequency domain resources are indicated in the control information can be reduced, thereby increasing utilization of time-frequency resources. In addition, because bits occupied by the control information are reduced, a time required for generating the control information is correspondingly shortened, thereby improving efficiency.

Optionally, the control information may be DCI.

Optionally, the DCI may further include modulation and coding scheme, a hybrid automatic repeat request process number, a new data indication, a redundancy version, control information related to multi-antenna transmission, and the like.

In a possible implementation, the control information includes a resource allocation header field, and the resource allocation header field is used to indicate the resource identifier.

In a possible implementation, all the frequency domain resources that can be allocated by the base station are all frequency domain resources that can be supported by the terminal device on one carrier or all bandwidths that can be supported by the terminal device on one carrier; or all the frequency domain resources that can be allocated by the base station are all frequency domain resources that can be allocated by the base station on one carrier or all bandwidths that can be allocated by the base station on one carrier.

In a possible implementation, the control information further includes a time domain resource start field and a time domain resource length field, the time domain resource start field is used to indicate information about a start location of allocated time domain resources, and the time domain resource length field is used to indicate information about a length of the allocated time domain resources.

Optionally, the control information may further include information about a start symbol and an end symbol of allocated time-frequency resources, or information about a symbol length and an end symbol of allocated time-frequency resources.

Optionally, when there is no control information having a same length as the control information, the control information may not include the resource allocation header field. Information about the allocated frequency domain resources may be preconfigured, that is, it is preconfigured that the allocated frequency domain resources are all the frequency domain resources that can be allocated by the base station. Optionally, the allocated frequency domain resources are preconfigured by using a correspondence binding a format of the control information and the allocated frequency domain resources.

According to a second aspect, an embodiment of this application provides a communication method, including:

allocating time-frequency resources to a terminal device; and sending control information to the terminal device, where the control information includes a resource identifier, and the resource identifier is used to indicate whether the allocated time-frequency resources are changed.

In the method, the allocated time-frequency resources are indicated by using the resource identifier in the control information. Because the identifier occupies a small quantity of bits, bits occupied by information about allocated resources can be reduced, and time-frequency resources occupied because the allocated time-frequency resources are indicated in the control information can be reduced, thereby increasing utilization of time-frequency resources. In addition, because bits occupied by the control information are reduced, a time required for generating the control information is correspondingly shortened, thereby improving efficiency.

Optionally, the control information may be DCI.

Optionally, the DCI may further include modulation and coding scheme, a hybrid automatic repeat request process number, a new data indication, a redundancy version, control information related to multi-antenna transmission, and the like.

In an implementation, whether the allocated time-frequency resources are changed means whether the allocated time-frequency resources are changed relative to obtained valid time-frequency resources.

In a possible implementation, the control information includes an offset, and the offset is used to indicate an offset value of the allocated time-frequency resources; and the offset is indicated by a field newly added to the control information or an existing field in the control information.

Optionally, when the offset may be indicated by the existing field in the control information, the offset may be indicated by using a hybrid automatic repeat request process number field, a new data indication field, a redundancy version field, a beam number field, or the like.

In a possible implementation, a predefined offset is sent to the terminal device through higher layer signaling. In another implementation, the offset may be a predefined offset. Optionally, the higher layer signaling includes a MAC control element (Medium Access Control-Control Element, MAC-CE) or radio resource control (Radio resource control, RRC).

Optionally, the predefined offset is a preset offset between a base station and the terminal device through a pre-agreement, a pre-negotiation, or a standard definition.

In a possible implementation, when the resource identifier indicates that the allocated time-frequency resources are changed, the control information includes the offset. In a possible implementation, when the resource identifier indicates that the allocated time-frequency resources are unchanged, the base station no longer needs to add the offset to the control information, thereby reducing transmission resources.

In a possible implementation, the control information includes a resource allocation header field, and the resource allocation header field is used to indicate the resource identifier.

Optionally, when one beam of the base station covers only one terminal device, the control information includes only the resource identifier.

Optionally, when there is no control information having a same length as the control information, the control information may not include the resource allocation header field. Information about the allocated time-frequency resources may be preconfigured, that is, information about a change of the allocated time-frequency resources or information about a change of the allocated time-frequency resources relative to the valid time-frequency resources obtained by the terminal device may be preconfigured. Optionally, the time-frequency resources allocated to the terminal device are preconfigured by using a correspondence binding a format of the control information and the allocated time-frequency resources.

According to a third aspect, an embodiment of this application provides a communication method, including:

receiving control information sent by a base station, where the control information includes a resource identifier, and the resource identifier is used to indicate that allocated frequency domain resources are all frequency domain resources that can be allocated by the base station, and obtaining information about the allocated frequency domain resources based on the resource identifier.

In the method, because the resource identifier in the received control information occupies a small quantity of bits, bits occupied by information about allocated resources can be reduced, and time-frequency resources occupied because the allocated frequency domain resources are indicated in the control information can be reduced, thereby increasing utilization of time-frequency resources. In addition, because bits occupied by the control information are reduced, a time required for parsing the control information is correspondingly shortened, thereby improving efficiency.

Optionally, the control information may be DCI.

Optionally, the DCI may further include modulation and coding scheme, a hybrid automatic repeat request process number, a new data indication, a redundancy version, control information related to multi-antenna transmission, and the like.

In a possible implementation, the control information includes a resource allocation header field, and the resource allocation header field is used to indicate the resource identifier; and the method may further include: obtaining the resource identifier based on the resource allocation header field.

In a possible implementation, all the frequency domain resources that can be allocated by the base station are all frequency domain resources that can be supported by a terminal device on one carrier or all bandwidths that can be supported by the terminal device on one carrier; or all the frequency domain resources that can be allocated by the base station are all frequency domain resources that can be allocated by the base station on one carrier or all bandwidths that can be allocated by the base station on one carrier.

In a possible implementation, the control information further includes a time domain resource start field and a time domain resource length field, the time domain resource start field indicates information about a start location of allocated time domain resources, and the time domain resource length field indicates information about a length of the allocated time domain resources; and the method further includes: obtaining information about the allocated time domain resources based on the time domain resource start field and the time domain resource length field.

Optionally, the control information may further include a start symbol field and an end symbol field of allocated time-frequency resources, or a symbol length field and an end symbol field of allocated time-frequency resources.

Optionally, when there is no control information having a same length as the control information, the control information may not include the resource allocation header field. Information about the allocated frequency domain resources may be preconfigured, that is, it is preconfigured that the allocated frequency domain resources are all the frequency domain resources that can be allocated by the base station. Optionally, the allocated frequency domain resources are preconfigured by using a correspondence binding a format of the control information and the allocated frequency domain resources.

According to a fourth aspect, an embodiment of this application provides a communication method, including:

receiving control information sent by a base station, where the control information includes a resource identifier, and the resource identifier is used to indicate whether allocated time-frequency resources are changed; and obtaining, based on the resource identifier, information indicating whether the allocated time-frequency resources are changed.

In the method, because the resource identifier in the received control information occupies a small quantity of bits, bits occupied by information about allocated resources can be reduced, and time-frequency resources occupied because the allocated time-frequency resources are indicated in the control information can be reduced, thereby increasing utilization of time-frequency resources. In addition, because bits occupied by the control information are reduced, a time required for parsing the control information is correspondingly shortened, thereby improving efficiency.

Optionally, the control information may be DCI.

Optionally, the DCI may further include modulation and coding scheme, a hybrid automatic repeat request process number, a new data indication, a redundancy version, control information related to multi-antenna transmission, and the like.

In a possible implementation, whether the allocated time-frequency resources are changed means whether the allocated time-frequency resources are changed relative to obtained valid time-frequency resources.

In a possible implementation, the control information includes an offset, and the offset is used to indicate an offset value of the allocated time-frequency resources; and the offset value of the allocated time-frequency resources is obtained by using the offset; and the offset may be indicated by a field newly added to the control information or an existing field in the control information.

Optionally, when the offset is indicated by the existing field in the control information, the offset may be indicated by using a hybrid automatic repeat request process number field, a new data indication field, a redundancy version field, a beam number field, or the like.

In a possible implementation, a predefined offset is obtained through higher layer signaling; or an offset value is determined based on a predefined offset.

Optionally, the higher layer signaling may be a MAC-CE or RRC.

Optionally, the predefined offset is a preset offset between the base station and a terminal device through a pre-agreement, a pre-negotiation, or a standard definition.

In a possible implementation, when the resource identifier indicates that the allocated time-frequency resources are changed, the control information includes the offset.

In a possible implementation, when the resource identifier indicates that the allocated time-frequency resources are unchanged, the control information does not carry the offset, thereby reducing transmission resources.

Optionally, the method may further include:

obtaining, based on the resource identifier, information indicating whether the allocated time-frequency resources are changed.

In a possible implementation, the control information includes a resource allocation header field, and the resource identifier is obtained by using the resource allocation header field.

Optionally, when there is no control information having a same length as the control information, the control information may not include the resource allocation header field. Information about the allocated time-frequency resources may be preconfigured, that is, whether the allocated time-frequency resources are changed may be preconfigured. Optionally, the allocated time-frequency resources are preconfigured by using a correspondence binding a format of the control information and whether the allocated time-frequency resources are changed.

According to a fifth aspect, an embodiment of this application provides a communications device, including a memory, a processor, and a computer program that is stored in the memory and that can be run on the processor. When the processor executes the program, the communications device implements a corresponding step in the method provided in any one of the first aspect or the possible implementations of the first aspect.

According to a sixth aspect, an embodiment of this application provides a communications device, including a memory, a processor, and a computer program that is stored in the memory and that can be run on the processor. When the processor executes the program, the communications device implements a corresponding step in the method provided in any one of the second aspect or the possible implementations of the second aspect.

According to a seventh aspect, an embodiment of this application provides a communications device, including a memory, a processor, and a computer program that is stored in the memory and that can be run on the processor. When the processor executes the program, the communications device implements a corresponding step in the method provided in any one of the third aspect or the possible implementations of the third aspect.

According to an eighth aspect, an embodiment of this application provides a communications device, including a memory, a processor, and a computer program that is stored in the memory and that can be run on the processor. When the processor executes the program, the communications device implements a corresponding step in the method provided in any one of the fourth aspect or the possible implementations of the fourth aspect.

According to a ninth aspect, an embodiment of this application provides a communications device, including a control information generation unit and a sending unit, where the control information generation unit is configured to generate control information, where the control information includes a resource identifier, and the resource identifier is used to indicate that allocated frequency domain resources are all frequency domain resources that can be allocated by the communications device; and the sending unit is configured to send the control information to a terminal device.

The control information generated by the communications device includes the resource identifier, and the resource identifier is used to indicate the allocated frequency domain resources. Because the identifier occupies a small quantity of bits, bits occupied by information about allocated resources can be reduced, and time-frequency resources occupied because the allocated frequency domain resources are indicated in the control information can be reduced, thereby increasing utilization of time-frequency resources. In addition, because bits occupied by the control information are reduced, a time required for generating the control information is correspondingly shortened, thereby improving efficiency.

Optionally, the control information may be DCI.

Optionally, the DCI may further include modulation and coding scheme, a hybrid automatic repeat request process number, a new data indication, a redundancy version, control information related to multi-antenna transmission, and the like.

In a possible implementation, the control information includes a resource allocation header field, and the resource allocation header field is used to indicate the resource identifier.

In a possible implementation, all the frequency domain resources that can be allocated by the communications device are all frequency domain resources that can be supported by the terminal device on one carrier or all bandwidths that can be supported by the terminal device on one carrier; or all the frequency domain resources that can be allocated by the communications device are all frequency domain resources that can be allocated by the communications device on one carrier or all bandwidths that can be allocated by the communications device on one carrier.

In a possible implementation, the control information further includes a time domain resource start field and a time domain resource length field, the time domain resource start field is used to indicate information about a start location of allocated time domain resources, and the time domain resource length field is used to indicate information about a length of the allocated time domain resources.

Optionally, the control information may further include information about a start symbol and an end symbol of allocated time-frequency resources, or information about a symbol length and an end symbol of allocated time-frequency resources.

Optionally, when there is no control information having a same length as the control information, the control information may not include the resource allocation header field. Information about the allocated frequency domain resources may be preconfigured, that is, it is preconfigured that the allocated frequency domain resources are all the frequency domain resources that can be allocated by the communications device. Optionally, the allocated frequency domain resources are preconfigured by using a correspondence binding a format of the control information and the allocated frequency domain resources.

According to a tenth aspect, an embodiment of this application provides a communications device, including a control information generation unit and a sending unit, where the control information generation unit is configured to generate control information, where the control information includes a resource identifier, and the resource identifier is used to indicate whether allocated time-frequency resources are changed; and the sending unit is configured to send the control information.

The control information generated by the communications device includes the resource identifier, and the resource identifier is used to indicate the allocated time-frequency resources. Because the identifier occupies a small quantity of bits, bits occupied by information about allocated resources can be reduced, and time-frequency resources occupied because the allocated time-frequency resources are indicated in the control information can be reduced, thereby increasing utilization of time-frequency resources. In addition, because bits occupied by the control information are reduced, a time required for generating the control information is correspondingly shortened, thereby improving efficiency.

Optionally, the control information may be DCI.

Optionally, the DCI may further include modulation and coding scheme, a hybrid automatic repeat request process number, a new data indication, a redundancy version, control information related to multi-antenna transmission, and the like.

Optionally, the resource identifier is used to indicate whether the allocated time-frequency resources are changed relative to obtained valid time-frequency resources.

In a possible implementation, the control information includes an offset, and the offset is used to indicate an offset value of the allocated time-frequency resources; and the offset is indicated by a field newly added to the control information or an existing field in the control information.

Optionally, when the offset is indicated by the existing field in the control information, the offset may be indicated by a hybrid automatic repeat request process number field, a new data indication field, a redundancy version field, a beam number field, or the like.

In a possible implementation, a predefined offset is sent to a terminal device through higher layer signaling; or the offset is a predefined offset.

Optionally, the higher layer signaling may be a MAC-CE or RRC.

In a possible implementation, when the resource identifier indicates that the allocated time-frequency resources are changed, the control information includes the offset. In a possible implementation, when the resource identifier indicates that the allocated time-frequency resources are unchanged, the communications device no longer needs to add the offset to the control information, thereby reducing transmission resources.

In a possible implementation, the control information includes a resource allocation header field, and the resource allocation header field is used to indicate identifiers of the time-frequency resources allocated to the terminal device.

Optionally, when one beam of the communications device covers only one terminal device, the control information includes only the resource identifier.

Optionally, when there is no control information having a same length as the control information, the control information may not include the resource allocation header field. Information about the allocated time-frequency resources may be preconfigured, that is, information about a change of the allocated time-frequency resources or information about a change of the allocated time-frequency resources relative to the valid time-frequency resources obtained by the terminal device may be preconfigured. Optionally, the time-frequency resources allocated to the terminal device are preconfigured by using a correspondence binding a format of the control information and the allocated time-frequency resources.

According to an eleventh aspect, an embodiment of this application provides a communications device, including a receiving unit and an obtaining unit, where the receiving unit is configured to receive control information sent by a base station, where the control information includes a resource identifier, and the resource identifier is used to indicate that allocated frequency domain resources are all frequency domain resources that can be allocated by the base station; and the obtaining unit is configured to obtain information about the allocation frequency domain resources based on the resource identifier.

The control information received by the communications device includes the resource identifier. Because the resource identifier occupies a small quantity of bits, bits occupied by information about allocated resources can be reduced, and time-frequency resources occupied because the allocated frequency domain resources are indicated in the control information can be reduced, thereby increasing utilization of time-frequency resources. In addition, because bits occupied by the control information are reduced, a time required for parsing the control information is correspondingly shortened, thereby improving efficiency.

Optionally, the control information may be DCI.

Optionally, the DCI may further include modulation and coding scheme, a hybrid automatic repeat request process number, a new data indication, a redundancy version, control information related to multi-antenna transmission, and the like.

In a possible implementation, the control information includes a resource allocation header field, and the resource allocation header field is used to indicate the resource identifier; and the obtaining unit is further configured to obtain the resource identifier based on the resource allocation header field.

In a possible implementation, all the frequency domain resources that can be allocated by the base station are all frequency domain resources that can be supported by the communications device on one carrier or all bandwidths that can be supported by the communications device on one carrier; or all the frequency domain resources that can be allocated by the base station are all frequency domain resources that can be allocated by the base station on one carrier or all bandwidths that can be allocated by the base station on one carrier.

In a possible implementation, the control information further includes a time domain resource start field and a time domain resource length field, the time domain resource start field indicates information about a start location of allocated time domain resources, and the time domain resource length field indicates information about a length of the allocated time domain resources; and the obtaining unit is further configured to obtain information about the allocated time domain resources based on the time domain resource start field and the time domain resource length field.

Optionally, the control information may further include a start symbol field and an end symbol field of allocated time-frequency resources, or a symbol length field and an end symbol field of allocated time-frequency resources. Correspondingly, the obtaining unit is further configured to obtain information about the allocated time-frequency resources based on the start symbol field and the end symbol field of the time-frequency resources, or obtain information about the allocated time-frequency resources based on the symbol length field and the end symbol field of the time-frequency resources.

Optionally, when there is no control information having a same length as the control information, the control information may not include the resource allocation header field. Information about the allocated frequency domain resources may be preconfigured, that is, it is preconfigured that the allocated frequency domain resources are all the frequency domain resources that can be allocated by the base station. Optionally, the allocated frequency domain resources are preconfigured by using a correspondence binding a format of the control information and the allocated frequency domain resources.

According to a twelfth aspect, an embodiment of this application provides a communications device, including a receiving unit and an obtaining unit, where the receiving unit is configured to receive control information sent by a base station, where the control information includes a resource identifier, and the resource identifier is used to indicate whether allocated time-frequency resources are changed; and the obtaining unit is configured to obtain, based on the resource identifier, information indicating whether the allocated time-frequency resources are changed.

The control information received by the communications device includes the resource identifier. Because the resource identifier occupies a small quantity of bits, bits occupied by information about allocated resources can be reduced, and time-frequency resources occupied because allocated frequency domain resources are indicated in the control information can be reduced, thereby increasing utilization of time-frequency resources. In addition, because bits occupied by the control information are reduced, a time required for parsing the control information is correspondingly shortened, thereby improving efficiency.

Optionally, the control information may be DCI.

Optionally, the DCI may further include modulation and coding scheme, a hybrid automatic repeat request process number, a new data indication, a redundancy version, control information related to multi-antenna transmission, and the like; and the resource identifier is used to indicate whether the allocated time-frequency resources are changed relative to obtained valid time-frequency resources.

In a possible implementation, the control information includes an offset; and the obtaining unit is further configured to obtain an offset value by using the offset; where the offset is indicated by a field newly added to the control information or an existing field in the control information.

Optionally, when the offset is indicated by the existing field in the control information, the offset may be indicated by using a hybrid automatic repeat request process number field, a new data indication field, a redundancy version field, a beam number field, or the like.

In a possible implementation, the obtaining unit is further configured to obtain a predefined offset through higher layer signaling; or determine an offset value based on a predefined offset.

Optionally, the higher layer signaling may be a MAC-CE or RRC.

In a possible implementation, when the resource identifier indicates that the allocated time-frequency resources are changed, the control information includes the offset.

In a possible implementation, when the resource identifier indicates that the allocated time-frequency resources are unchanged, the base station no longer needs to add the offset to the control information, thereby reducing transmission resources. Optionally, the obtaining unit is further configured to obtain, based on the resource identifier, information indicating whether the allocated time-frequency resources are changed.

In a possible implementation, the control information includes a resource allocation header field, and the obtaining unit is further configured to obtain the resource identifier by using the resource allocation header field.

Optionally, when there is no control information having a same length as the control information, the control information may not include the resource allocation header field. Information about the allocated time-frequency resources may be preconfigured, that is, whether the allocated time-frequency resources are changed may be preconfigured. Optionally, the allocated time-frequency resources are preconfigured by using a correspondence binding a format of the control information and whether the allocated time-frequency resources are changed.

According to a thirteenth aspect, an embodiment of this application provides a communication method, including:

allocating, by a base station, communication resources to a terminal device; and sending, by the base station, control information to the terminal device, where the control information includes a resource identifier, and the resource identifier is used to indicate that allocated frequency domain resources are some of all frequency domain resources that can be allocated by the base station.

In the method, the allocated frequency domain resources are indicated by using the resource identifier in the control information. Because the identifier occupies a small quantity of bits, bits occupied by information about allocated resources can be reduced, and time-frequency resources occupied because the allocated frequency domain resources are indicated in the control information can be reduced, thereby increasing utilization of time-frequency resources. In addition, because bits occupied by the control information are reduced, a time required for generating the control information is correspondingly shortened, thereby improving efficiency.

In a possible implementation, the control information includes a resource block allocation field, the resource block allocation field is used to indicate identifiers of some frequency domain resources allocated to the terminal device, and the identifiers of the some frequency domain resources are identifiers of some of frequency domain resources obtained after all the frequency domain resources that can be allocated by the base station are divided in a fixed division manner.

For an implementation of the thirteenth aspect in this embodiment of this application, refer to any possible implementation of the first aspect. Details are not described again.

According to a fourteenth aspect, an embodiment of this application provides a communications device, including a memory, a processor, and a computer program that is stored in the memory and that can be run on the processor. When the processor executes the program, the communications device implements a corresponding step in the method provided in any one of the thirteenth aspect or the possible implementations of the thirteenth aspect.

According to a fifteenth aspect, an embodiment of this application provides a communications device, including a control information generation unit and a sending unit, where the control information generation unit is configured to generate control information, where the control information includes a resource identifier, and the resource identifier is used to indicate that allocated frequency domain resources are some of all frequency domain resources that can be allocated by the communications device, and the sending unit is configured to send the control information to a terminal device.

Because the resource identifier in the control information generated by the communications device occupies a small quantity of bits, bits occupied by information about allocated resources can be reduced, and time-frequency resources occupied because the allocated frequency domain resources are indicated in the control information can be reduced, thereby increasing utilization of time-frequency resources. In addition, because bits occupied by the control information are reduced, a time required for generating the control information is correspondingly shortened, thereby improving efficiency.

Optionally, the control information may be DCI.

Optionally, the DCI may further include modulation and coding scheme, a hybrid automatic repeat request process number, a new data indication, a redundancy version, control information related to multi-antenna transmission, and the like.

In a possible implementation, the control information includes a resource block allocation field, the resource block allocation field is used to indicate identifiers of some allocated frequency domain resources, and the identifiers of the some frequency domain resources are identifiers of some of frequency domain resources obtained after all the frequency domain resources that can be allocated by the communications device are divided in a fixed division manner.

In a possible implementation, the control information includes a resource allocation header field, and the resource allocation header field is used to indicate the resource identifier.

In a possible implementation, all the frequency domain resources that can be allocated by the communications device are all frequency domain resources that can be supported by the terminal device on one carrier or all bandwidths that can be supported by the terminal device on one carrier; or all the frequency domain resources that can be allocated by the communications device are all frequency domain resources that can be allocated by the communications device on one carrier or all bandwidths that can be allocated by the communications device on one carrier.

In a possible implementation, the control information further includes a time domain resource start field and a time domain resource length field, the time domain resource start field is used to indicate information about a start location of allocated time domain resources, and the time domain resource length field is used to indicate information about a length of the allocated time domain resources.

Optionally, the control information may further include information about a start symbol and an end symbol of allocated time-frequency resources, or information about a symbol length and an end symbol of allocated time-frequency resources.

Optionally, when there is no control information having a same length as the control information, the control information may not include the resource allocation header field. Information about the allocated frequency domain resources may be preconfigured, that is, it is preconfigured that the allocated frequency domain resources are some frequency domain resources that can be allocated by the communications device. Optionally, the allocated frequency domain resources are preconfigured by using a correspondence binding a format of the control information and the allocated frequency domain resources.

According to a sixteenth aspect, an embodiment of this application provides a communication method, including:

receiving control information sent by a base station, where the control information includes a resource identifier, and the resource identifier is used to indicate that allocated frequency domain resources are some of all frequency domain resources that can be allocated by the base station; and obtaining information about the allocated frequency domain resources based on the identifier.

In the method, because the resource identifier in the received control information occupies a small quantity of bits, bits occupied by information about allocated resources can be reduced, and time-frequency resources occupied because the allocated frequency domain resources are indicated in the control information can be reduced, thereby increasing utilization of time-frequency resources. In addition, because bits occupied by the control information are reduced, a time required for parsing the control information is correspondingly shortened, thereby improving efficiency.

In a possible implementation, the control information includes a resource block allocation field, the resource block allocation field is used to indicate identifiers of some frequency domain resources allocated to a terminal device, and the identifiers of the some frequency domain resources are identifiers of some of frequency domain resources obtained after all the frequency domain resources that can be allocated by the base station are divided in a fixed division manner.

For an implementation of the sixteenth aspect in this embodiment of this application, refer to any possible implementation of the third aspect. Details are not described again.

According to a seventeenth aspect, an embodiment of this application provides a communications device, including a memory, a processor, and a computer program that is stored in the memory and that can be run on the processor. When the processor executes the program, the communications device implements a corresponding step in the method provided in any one of the sixteenth aspect or the possible implementations of the sixteenth aspect.

According to an eighteenth aspect, an embodiment of this application provides a communications device, including a receiving unit and an obtaining unit, where the receiving unit is configured to receive control information sent by a base station, where the control information includes a resource identifier, and the resource identifier is used to indicate that allocated frequency domain resources are some of all frequency domain resources that can be allocated by the base station; and the obtaining unit is configured to obtain information about the allocation frequency domain resources based on the identifier.

Because the resource identifier in the control information received by the communications device occupies a small quantity of bits, bits occupied by information about allocated resources can be reduced, and time-frequency resources occupied because the allocated frequency domain resources are indicated in the control information can be reduced, thereby increasing utilization of time-frequency resources. In addition, because bits occupied by the control information are reduced, a time required for parsing the control information is correspondingly shortened, thereby improving efficiency.

Optionally, the control information may be DCI. Optionally, the DCI may further include modulation and coding scheme, a hybrid automatic repeat request process number, a new data indication, a redundancy version, control information related to multi-antenna transmission, and the like.

In a possible implementation, the control information includes a resource allocation header field, and the resource allocation header field is used to indicate the resource identifier; and the obtaining unit is further configured to obtain the allocated resource identifier based on the resource allocation header field.

In a possible implementation, the control information includes a resource block allocation field, the resource block allocation field is used to indicate identifiers of some allocated frequency domain resources, and the identifiers of the some frequency domain resources are identifiers of some of frequency domain resources obtained after all the frequency domain resources that can be allocated by the base station are divided in a fixed division manner.

In a possible implementation, all the frequency domain resources that can be allocated by the base station are all frequency domain resources that can be supported by the communications device on one carrier or all bandwidths that can be supported by the communications device on one carrier; or all the frequency domain resources that can be allocated by the base station are all frequency domain resources that can be allocated by the base station on one carrier or all bandwidths that can be allocated by the base station on one carrier.

In a possible implementation, the control information further includes a time domain resource start field and a time domain resource length field, the time domain resource start field indicates information about a start location of allocated time domain resources, and the time domain resource length field indicates information about a length of the allocated time domain resources; and the obtaining unit is further configured to obtain information about the allocated time domain resources based on the time domain resource start field and the time domain resource length field.

Optionally, the control information may further include a start symbol field and an end symbol field of allocated time-frequency resources, or a symbol length field and an end symbol field of allocated time-frequency resources. Correspondingly, the obtaining unit is further configured to obtain information about the allocated time-frequency resources based on the start symbol field and the end symbol field of the time-frequency resources, or obtain information about the allocated time-frequency resources based on the symbol length field and the end symbol field of the time-frequency resources.

Optionally, when there is no control information having a same length as the control information, the control information may not include the resource allocation header field. Information about the allocated frequency domain resources may be preconfigured, that is, it is preconfigured that the allocated frequency domain resources are some frequency domain resources that can be allocated by the base station. Optionally, the allocated frequency domain resources are preconfigured by using a correspondence binding a format of the control information and the allocated frequency domain resources.

An embodiment of this application further provides a computer readable medium, and the computer readable medium is configured to store a computer program. When the computer program is run, the method in the foregoing aspect is performed.

An embodiment of this application further provides a computer program product including an instruction. When the instruction is run on a computer, the computer performs the method in any one of the foregoing possible implementations.

BRIEF DESCRIPTION OF DRAWINGS

To describe the technical solutions in the embodiments of this application more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 1(c) is a schematic diagram of an implementation of indicating resource allocation in frequency domain when a resource allocation type 2 is used;

FIG. 2 is a schematic diagram of a distribution structure of allocated time-frequency resources according to an embodiment of this application;

FIG. 3(a) shows a table of correspondence between each resource allocation-related field in DCI sent by a base station to a terminal device and a corresponding bit length:

FIG. 3(b) shows a table of correspondence between each resource allocation-related field in DCI sent by a base station to a terminal device and a corresponding bit length when the base station sends all time-frequency resources to the terminal device:

FIG. 6(c) shows an implementation in which a new data indication field is reused to indicate an offset;

FIG. 7 is a schematic diagram of a distribution structure of allocated time-frequency resources when time-frequency resources allocated at two times are the same according to an embodiment of this application;

FIG. 8 shows a table of correspondence between a resource allocation-related field and a corresponding bit length when time-frequency resources allocated at two times are the same according to an embodiment of this application:

FIG. 9 is a schematic diagram of a basic structure of a communications device 100 according to an embodiment of this application;

DESCRIPTION OF EMBODIMENTS

Figure 1A:
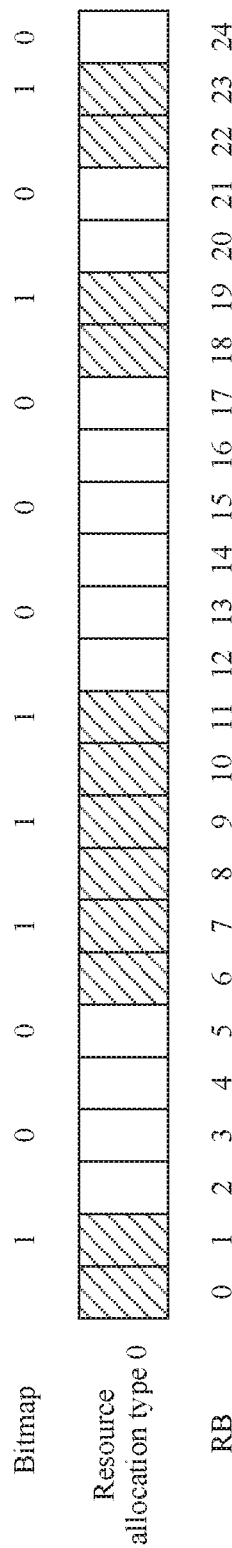
FIG. 1(a) is a schematic diagram of an implementation in which a bitmap is used to indicate time-frequency resource allocation when a resource allocation type is an allocation type 0.

The following describes the embodiments of the present invention with reference to accompanying drawings.

In addition, the terms "first" and "second" in this application are merely intended for a purpose of description, and shall not be understood as an indication or implication of relative importance or implicit indication of the quantity of indicated technical features. Therefore, a feature limited by "first" or "second" may explicitly or implicitly include one or more features.

A terminal device in this application is a device having a wireless communication function, and may be a handheld device having a wireless communication function, an in-vehicle device, a wearable device, a computing device, another processing device connected to a wireless modem, or the like. In different networks, the terminal device may have different names, for example, user equipment, an access terminal, a subscriber unit, a subscriber station, a mobile station, a mobile console, a remote station, a remote terminal, a mobile device, a user terminal, a terminal, a wireless communications device, a user agent or a user apparatus, a cellular phone, a cordless phone, a session initiation protocol (Session Initiation Protocol, SIP) phone, a wireless local loop (Wireless Local Loop, WLL) station, a personal digital assistant (Personal Digital Assistant, PDA), and a terminal device in a 5G network or a future evolved network.

A base station in this application may also be referred to as a base station device, and is a device that is deployed in a wireless access network and that is configured to provide a wireless communication function. The base station may be a base transceiver station (Base Transceiver Station, BTS for short) in a global system for mobile communications (Global System for Mobile communications. GSM for short) or code division multiple access (Code Division Multiple Access, CDMA for short); may be a NodeB (NodeB, NB for short) in wideband code division multiple access (Wideband Code Division Multiple Access, WCDMA for short); or may be an evolved NodeB (Evolved NodeB, eNB or eNodeB for short) in long term evolution (Long Term Evolution, LTE for short), a relay station or an access point, a transmission node or a transmission and reception point (transmission and reception point, TRP or TP) or a next generation NodeB (generation NodeB, gNB) in a new radio (new radio, NR) system, a Wireless Fidelity (Wireless-Fidelity, Wi-Fi) station, a wireless backhaul node, a small cell, a micro base station, a gNB in a future 5th generation mobile communication (the 5th Generation Mobile Communication, 5G) network, or the like. This is not limited in this application.

In this application, a communication resource may also be referred to as a resource for short. The communication resource may be used to transmit a signal. There are a plurality of types of communication resources. For example, from a perspective of physical characteristics, the communication resources may be classified into a space resource, a time domain resource, and a frequency domain resource. For example, from a perspective of different representations, the communication resources may be classified into a beam, a port, and the like. A set of communication resources of different types is also a type of communication resource. For example, a time-frequency resource (including a time domain resource and a frequency domain resource) is a type of communication resource, and a combination of a beam and a port is also a type of communication resource.

A channel is sent in a unit of a radio frame in an LTE system. One radio frame (radio frame) includes 10 subframes (subframe), a length of each subframe is 1 millisecond (ms), each subframe includes two slots (slot), and each slot is 0.5 ms. A quantity of symbols included in each slot is related to a length of a cyclic prefix (cyclic prefix, CP) in the subframe. If the CP is a normal (normal) CP, each slot includes seven symbols, and each subframe includes 14 symbols. For example, each subframe includes symbols whose sequence numbers are respectively #0, #1, #2,#3, #4,#5, #6,#7, #8,#9, #10, #11, #12, and #13. If the CP is an extended (extended) CP, each slot includes six symbols, and each subframe includes 12 symbols. For example, each subframe includes symbols whose sequence numbers are respectively #0, #1, #2,#3, #4,#5, #6,#7, #8,#9, #10, and #11.

The symbol is also referred to as an orthogonal frequency division multiplexing (orthogonal frequency division multiplexing, OFDM) symbol.

A resource element (Resource element, RE) is a smallest physical resource including one subcarrier in one OFDM symbol in LTE.

A resource block (Resource block, RB) is a resource block obtained after REs are combined. For example, in LTE, each resource block includes 12 consecutive subcarriers in frequency domain and one 0.5 ms slot in time domain.

DCI is a binary bit stream, and is a QPSK symbol after the DCI is modulated. QPSK symbols on a plurality of subcarriers become orthogonal frequency division multiplexing (orthogonal frequency division multiplexing, OFDM) waveforms through inverse fast Fourier transform (Inverse Fast Fourier Transform, IFFT), and an OFDM waveform in a unit time is referred to as an OFDM symbol.

Usually, fields or information included in the DCI includes but is not limited to a resource allocation header (Resource allocation header), a resource block allocation (Resource block allocation), modulation and coding scheme (modulation and coding scheme), a hybrid automatic repeat request (Hybrid automatic repeat request, HARQ) process number (HARQ process number), a new data indication (New data indication), a redundancy version (Redundancy version), control information related to multi-antenna transmission, and the like. In addition, the DCI carries different content based on different transmission modes, and therefore the DCI may have different formats. Each piece of DCI includes a plurality of fields. DCI in all formats may have different composition fields, and may also have different lengths.

The resource allocation header field and the resource block allocation field in the DCI are used to indicate resource allocation-related information. The resource allocation-related information is used to indicate which time-frequency resources of the terminal device are scheduled for the terminal device to transmit data. The resource allocation header field is used to indicate a resource allocation type (Resource allocation type, RA type) of the terminal device, and the resource block allocation field is used to indicate frequency domain resources specifically scheduled for the terminal device.

In LTE, there are three RA types: an RA type 0, an RA type 1, and an RA type 2. Different RA types are used for different DCI formats. The base station may explicitly or implicitly notify the terminal device of an RA type used for the DCI. Explicit notification is indicating information about the RA type by using the resource allocation header field in the DCI. Implicit notification is presetting that only a particular RA type is used for some DCI, for example, only the RA type 2 is used. In this case, the resource allocation header field does not need to be used to indicate the information about the RA type.

The resource block allocation field is related to a resource allocation type. When the resource block allocation field of the base station in the DCI indicates time-frequency resources allocated to the terminal device, the resource block allocation field varies with a specific resource allocation type. Details are as follows:

When the RA type 0 is used, a bitmap is used to indicate an independent continuous resource block group (RBG) in frequency domain. Compared with that a resource block (RB) is directly used, a quantity of bits in the bitmap is decreased by using the resource block group. A length of the bitmap may be calculated by using $N_{RBG}=\lceil N_{RB}^{DL}/P \rceil$, where $\lceil \ \rceil$ is a round up symbol, and $N_{RB}^{DL}$ is a system bandwidth (which is in a unit of an RB). A size P of a group depends on the system bandwidth.

FIG. 1(a) is a schematic diagram of an implementation in which a bitmap is used to indicate time-frequency resource allocation when a resource allocation type is an RA type 0. Assuming that a system bandwidth is 25 RBs and P=2, there are 13 RBGs. A shaded portion in FIG. 1(a) represents an allocated resource block group. Correspondingly, the resource block allocation field is {1001110001010}.

When the resource allocation type 1 is used, resource block groups are divided into P subsets. Specifically, in the resource allocation type 1, three fields are used to indicate allocated time-frequency resources. A first field has a length of $\lceil \log_2(P) \rceil$, and is used to indicate a selected subset, that is, a $(0 \le p \le P)^{th}$ resource block group subset is selected. A second field has a length of 1 bit, and is used to indicate whether there is an offset $\Delta_{shift}(p)$. The offset $\Delta_{shift}(p) = N_{RB}^{RBGsubset}(p) - N_{RB}^{TYPE1}$. A third field is a bitmap, and each bit in the bitmap indicates whether each resource block in a selected resource block group subset is allocated. A length of the third field is $N_{RB}^{TYPE1} = \lceil N_{RB}^{DL}/P \rceil - \lceil \log_2(P) \rceil - 1$.

Figure 1B:
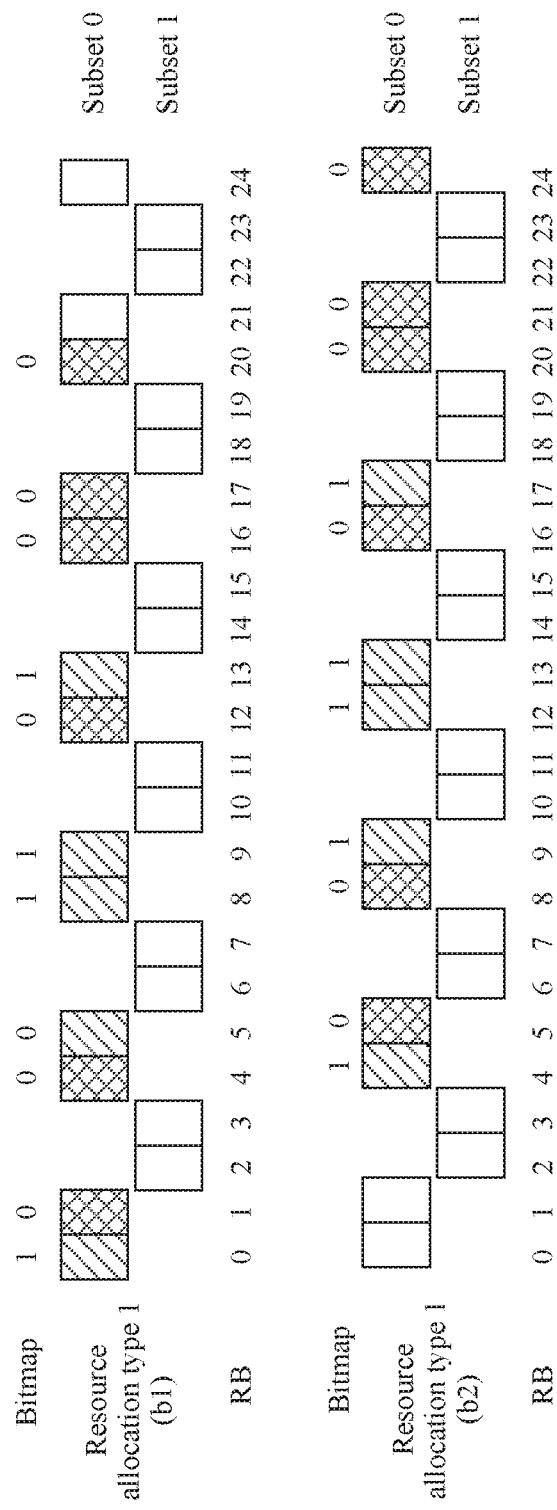
FIG. 1(b) is a schematic diagram of an implementation of indicating resource allocation in frequency domain when a resource allocation type 1 is used.

FIG. 1(b) is a schematic diagram of an implementation of indicating resource allocation in frequency domain when a resource allocation type 1 is used. An example in which a system bandwidth is 25 RBs and P=2 is still used for description. In FIG. 1(b), a second field shown in the RA type 1 (b1) is 0, that is, there is no offset and $\Delta_{shift}(p)=0$. Resource allocation is indicated in binary as {0010011101000}. A second field shown in the RA type 1 (b2) is 1, that is, $\Delta_{shift}(p)=2$. Resource allocation is indicated in binary as {0110011101000}.

When the resource allocation type 2 is used, information about allocated time-frequency resources is indicated by using a start location and a length for resource block allocation. Specifically, a resource indication value (RIV) is used, and the RIV is a function of a start location $RB_{start}$ and a length $L_{CRBs}$, that is:

$$\begin{aligned}&\text{if } ( L_{CRBs} - 1) \leq \lfloor N_{RB}{}^{CL} / 2 \rfloor \text{ then}\\&\quad RIV = N_{RB}{}^{CL}( L_{CRBs} - 1) + RB_{start}\\&\text{else}\\&\quad RIV = N_{RB}{}^{CL}( N_{RB}{}^{CL} - L_{CRBs} + 1) + ( N_{RB}{}^{CL} - 1 - RB_{start} )\end{aligned}$$

where $L_{CRBs} \geq 1$ and shall not exceed $N_{VFB}{}^{DL} - RB_{start}$.

FIG. 1(c) is a schematic diagram of an implementation of indicating resource allocation in frequency domain when a resource allocation type 2 is used. For example, a system bandwidth is 25 RBs. As shown in FIG. 1(c), resource allocation (which starts from the sixth RB, and a length is 9 RBs) may be indicated by RIV=206. When the RA type 2 is used, a resource allocation indication may be indicated by a binary sequence whose length is $\lceil \log_2(N_{RB}{}^{DL}(N_{RB}{}^{DL}+1)/2) \rceil$. Resource allocation shown in FIG. 1(c) is indicated in binary as {011001110}.

In the foregoing three resource allocation types, the resource block allocation field occupies a large quantity of bits, and consequently resource overheads are relatively large. The foregoing bandwidth of 25 RBs is used as an example. When the RA type 0 is used, 13 bits are required for the resource block allocation field; when the RA type 1 is used, 13 bits are required for the resource block allocation field; and when the RA type 2 is used, 9 bits are required for the resource block allocation field. In 5G NR, especially in high frequency communication, a bandwidth in the 5G NR is several times larger than that in LTE, and the resource block allocation field occupies more time-frequency resources. For example, in the first resource allocation type, 13 bits are required to indicate resource block distribution, 39 bits are obtained after channel coding at a 1/3 bit rate is performed on the 13 bits. When rate matching is not considered, 20 QPSK symbols also need to be used when QPSK is used. Each QPSK occupies one RE, and overheads of a total of 20 REs are required for resource block allocation, causing waste of time-frequency resources. When rate matching is considered, an actual transmission bit rate becomes high, that is, a proportion of valid information bits becomes large, and a transmission error rate becomes high.

An embodiment of this application provides a communication method, to reduce time-frequency resources occupied by resource allocation information in control information.

In a first possible implementation provided in this embodiment of this application, DCI sent by a base station includes an identifier used to indicate frequency domain resources allocated to a terminal device, and the identifier is used to indicate information about the frequency domain resources allocated to the terminal device. For example, the identifier may be used to indicate that the allocated frequency domain resources are all frequency domain resources that can be allocated by the base station, or may be used to indicate that the allocated frequency domain resources are some of all frequency domain resources that can be allocated by the base station. For example, in a possible implementation, available frequency domain resources are divided into K equal parts, where K is an integer greater than 1, for example, K=2, 3, or 4. One or more of the parts may be carried in control information sent by the base station to the terminal device at different times. For example, the base station may pre-divide available frequency domain resources into four equal parts, and add, to the DCI sent to the terminal device each time, one of parts obtained after all frequency domain resources that can be allocated by the base station are divided into four parts. In another possible implementation, available frequency domain resources may be divided into different irregular parts, and the identifier is used to indicate that the frequency domain resources allocated to the terminal device are some of the available frequency domain resources, for example, 1/5 or 3/5 of the available frequency domain resources.

When the base station indicates, by using the control information (for example, the DCI), the information about the frequency domain resources allocated to the terminal device, because the frequency domain resources are pre-divided, the base station may indicate, by using one or two identifiers, the frequency domain resources allocated to the terminal device. The pre-dividing the frequency domain resources may be as follows: The base station pre-divides the frequency domain resource, a frequency domain resource division manner is stipulated in a standard protocol stipulation, a frequency domain resource division manner is determined through a negotiation between the base station and the terminal device. Because the identifier occupies a relatively small quantity of bits, time-frequency resources occupied by resource allocation information can be effectively reduced. For example, a 1-bit identifier (for example, a resource allocation header field in the DCI) may be used to indicate that the frequency domain resources allocated to the terminal device are all available frequency domain resources. Alternatively, a 1-bit identifier (for example, a resource allocation header field in the DCI) may be used to indicate that the frequency domain resources allocated to the terminal device are some of available frequency domain resources (for example, 1/4 of the available frequency domain resources), and another identifier (for example, a resource block allocation field in the DCI) is used to indicate which part of four parts is the frequency domain resources allocated to the terminal device. Herein, the resource block allocation field is used to indicate that the frequency domain resources allocated to the terminal device are one of four parts obtained after frequency domain resources are divided, and may occupy 1 bit or 2 bits. In this implementation, one or more identifiers are used to indicate resources allocated to the terminal device, so that bits occupied by the control information can be reduced, and a time required for generating the control information is correspondingly shortened, thereby improving efficiency.

In an implementation, the foregoing frequency domain resource division manner may be a frequency domain resource division manner that is predetermined and remains unchanged, for example, dividing all the frequency domain resources (or available frequency domain resources) that can be allocated by the base station. In another implementation, the foregoing frequency domain resource division manner may be relatively fixed in a time period, and vary in different time periods. For example, at a time point T1, a division manner may be dividing all the frequency domain resources that can be allocated by the base station; at a time point T2, a division manner may be dividing all the frequency domain resources that can be allocated by the base station into four equal parts; and at a time point T3, a division manner is dividing all the frequency domain resources that can be allocated by the base station into 1/5, 3/5, and 1/5 of the frequency domain resources. In this way, the identifier can be conveniently used to indicate the information about the allocated frequency domain resources.

This implementation is applicable to a case in which a beam sent by the base station covers a relatively small quantity of terminal devices. When one beam covers a relatively small quantity of terminal devices, during resource scheduling, the base station may allocate, to one terminal device or relatively few terminal devices, all the frequency domain resources that can be allocated. Optionally, when the base station allocates, to relatively few terminal devices, the frequency domain resources that can be allocated, a frequency domain resource division manner may change, or may be an unchanged division manner.

In this application, all the frequency domain resources that can be allocated by the base station sometimes may be referred to as available frequency domain resources or assignable frequency domain resources, for example, may be all frequency domain resources that can be supported by the terminal device on one carrier, all bandwidth that can be supported by the terminal device on one carrier, all frequency domain resources that can be allocated by the base station on one carrier, or all bandwidth that can be allocated by the base station on one carrier. For example, a carrier has a specific bandwidth (for example, 20 MB Hertz), and all frequency domain resources corresponding to the carrier are all the frequency domain resources that can be allocated by the base station. Alternatively, a bandwidth of a carrier is reflected as a quantity of RBs, for example, 20 MB hertz, is corresponding to 100 RBs, and frequency domain resources corresponding to the 100 RBs are all the frequency domain resources that can be allocated by the base station. Different terminal devices may have different capabilities, and different terminal devices also support different frequency domain resources or bandwidths on a carrier. For example, one terminal device can support a maximum bandwidth of 20 MB on one carrier, and another terminal device can support a maximum bandwidth of 80 MB on one carrier. Therefore, for different terminal devices, all the frequency domain resources that can be allocated by the base station may be different.

An example in which the base station allocates, to the terminal device, all the frequency domain resources that can be allocated is used for description. For example, one beam covers two terminal devices, frequency domain resources allocated to a terminal device 1 are all frequency domain resources corresponding to two symbols, and frequency domain resources allocated to a terminal device 2 are all frequency domain resources corresponding to three symbols. In this case, 1 bit may be used in the resource allocation header field in the DCI sent by the base station to indicate identifiers of the allocated frequency domain resources, and the identifier is used to indicate that the frequency domain resources allocated to the terminal device are all the frequency domain resources that can be allocated by the base station.

FIG. 2 is a schematic diagram of a distribution structure of allocated time-frequency resources according to an embodiment of this application. In FIG. 2, a horizontal axis direction represents a time domain resource, and a vertical axis direction represents a frequency domain resource. One square in the horizontal axis direction represents a time domain resource corresponding to one symbol, and all squares in the vertical axis direction corresponding to one symbol represent all frequency domain resources corresponding to the symbol. In FIG. 2, frequency domain resources allocated to a terminal device 1 by the base station are all frequency domain resources corresponding to two symbols, and frequency domain resources allocated to a terminal device 2 are all frequency domain resources corresponding to three symbols. Frequency domain resources allocated to each terminal device are all the frequency domain resources that can be allocated by the base station. Therefore, 1 bit may be used in the resource allocation header field in the DCI to indicate the information, that is, 1 bit may be used to indicate identifiers of the frequency domain resources allocated to the terminal device. The identifier is used to indicate that the frequency domain resources allocated to the terminal device are all the frequency domain resources that can be allocated by the base station.

Optionally, the resource allocation header field used to indicate the allocated frequency domain resources may also be 2 bits. A quantity of bits occupied by the identifier used to indicate the frequency domain resources allocated to the terminal device is not limited in this embodiment of this application. Provided that a total quantity of bits of a field that is in the DCI and that is used to indicate resource allocation information is decreased to an extent, and time-frequency resources occupied by information used to indicate time-frequency resources can be reduced, the quantity of bits falls within coverage of this embodiment of this application. In addition, because bits occupied by the control information are reduced, a time required for generating the control information is correspondingly shortened, thereby improving efficiency.

In addition, in the implementation shown in FIG. 2, when 1 bit is used in the resource allocation header field to indicate the identifiers of the frequency domain resources allocated to the terminal device, information about time domain resources allocated to each terminal device needs to be further indicated in the DCI. In this way, the DCI includes both information about the frequency domain resources allocated to the terminal device and the information about the time domain resources allocated to the terminal device, and the terminal device can accurately obtain allocated time-frequency resources based on the resource information indicated in the DCI. The information about the time domain resources allocated to the terminal device may be information about a start symbol and a symbol length allocated to the terminal device, may be information about a start symbol and an end symbol allocated to the terminal device, or may be information about a symbol length and an end symbol. A specific manner of indicating the information about the time domain resources is not limited in this embodiment of this application, provided that the terminal device can obtain the specific information about the time domain resources.

A resource allocation type in the DCI sent by the base station is described below by using an example in which the base station indicates, in the DCI, that the frequency domain resources allocated to the terminal device are all the frequency domain resources that can be allocated by the base station and that the time domain resources allocated to the terminal device are a start symbol and a symbol length. FIG. 3(*a*) shows a table of correspondence between each resource allocation-related field in the DCI sent by the base station to the terminal device and a corresponding bit length.

In FIG. 3(*a*), the resource allocation header field occupies 1 bit to indicate the identifiers of the frequency domain resources allocated to the terminal device. The identifier is used to indicate a type of current resource allocation, that is, the frequency domain resources allocated to the terminal device are all the frequency domain resources that can be allocated by the base station. A start symbol field of a data channel occupies 2 bits, that is, a start symbol field of time domain resources occupied by the data channel occupies 2 bits, and is used to indicate a start symbol of the time domain resources allocated to the terminal device. A symbol length field occupied by the data channel occupies 2 bits, that is, a symbol length field occupied by the time domain resources occupied by the data channel occupies 2 bits, and is used to indicate a symbol length of the time domain resources allocated to the terminal device. In this way, the terminal device can obtain, based on information indicated by these fields in the DCI, information about specific time-frequency resources allocated by the base station.

In FIG. 3(a), a frequency domain resource information field that is in the DCI and that is used to indicate that resource allocation occupies 5 (1+2+2) bits in DCI that are less than the foregoing 13 or 9 bits. Therefore, time-frequency resources occupied by the resource allocation information can be reduced, and a time required for generating the control information is correspondingly shortened, thereby improving efficiency. Correspondingly, when the terminal device obtains the control information, because bits occupied by the control information are reduced, a time required for parsing the control information is correspondingly shortened, thereby improving efficiency.

It should be noted that in FIG. 3(a), a quantity of bits required for the start symbol field of the data channel and a quantity of bits required for the symbol length field occupied by the data channel may be obtained by using $\log_2(\lceil N_{symb}^{DL}/G \rceil)$, where $N_{symb}^{DL}$ represents a quantity of symbols in a downlink scheduling unit (a slot in this embodiment); G represents a granularity, that is, a minimum quantity of symbols that can be allocated; and $\log_2$ represents the logarithm to the base 2.

In another manner of indicating time domain resource allocation, for example, a field such as a symbol allocation field may be used to indicate allocated time domain resources. A possible implementation in which the field indicates the allocated time domain resources is as follows:

A time resource indication value (TRIV) is used, and the TRIV is a function of a start symbol $S_{start}$ and a symbol length $L_S$. The function may be as follows:

$$\text{if } (L_S - 1) \leq \lfloor N_{Sym}^{DL}/2 \rfloor \text{ then}$$
$$\text{TRIV} = N_{Sym}^{DL}(L_S - 1) + S_{start}$$
$$\text{else}$$
$$\text{TRIV} = N_{Sym}^{DL}(N_{Sym}^{DL} - L_S + 1)$$
$$+ (N_{Sym}^{DL} - 1 - S_{start})$$

where $L_S \geq 1$ and shall not exceed $N_{Sym}^{DL} - S_{start} \cdot N_{Sym}^{DL}$ is a quantity of symbols in a subframe/slot.

It may be understood that a quantity $N_{Sym}^{DL}$ of symbols in a subframe/slot may be a fixed value, and the fixed value may be predefined in a system. For example, $N_{Sym}^{DL}$ may be 6, 7, 12, 14, or the like. For example, $N_{Sym}^{DL}$ is 14. The foregoing function may be expressed as follows:

if$(L_s-1) \leq 7$ then

TRIV=$14 \times (L_s-1)+S_{start}$ else

TRIV=$14 \times (14-L_s+1)+(14-1-S_{start})$, where $0 < L_s < 14 - S_{start}$. It should be noted that TRIV=$14 \times (L_s-1)+S_{start}$ or TRIV=$14 \times (14-L_s+1)+(14-1-S_{start})$ is only an example of a mathematical expression. It may be understood that there may be a plurality of equivalent mathematical variations based on the mathematical expression. For example, TRIV=$14 \times (L_s-1)+S_{start}$ may also be represented as TRIV=$14 \times L_s - 14 + S_{start}$ or TRIV=$14 \times L_s + S_{start} - 14$. For another example, TRIV=$14 \times (14-L_s+1)+(14-1-S_{start})$ may also be represented as TRIV=$14 \times (15-L_s)+(13-S_{start})$ or TRIV=$197-14L_s-S_{start}$. A form of the mathematical expression is not limited in this embodiment of the present invention, provided that a result of the TRIV meets a calculation result of the mathematical expression.

Optionally, when one beam of the base station covers only one terminal device, the base station may allocate all time-frequency resources to the terminal device. Resource allocation-related information in the DCI may be indicated by a field (that is, the resource allocation header field), as shown in FIG. 3(b). Correspondingly, the terminal device may obtain, based on the resource allocation header field in the DCI, information about time-frequency resources allocated by the base station.

Optionally, in the implementation in FIG. 3(a) or FIG. 3(b), the resource allocation header field occupies 1 bit to indicate a resource allocation type, to distinguish the DCI from other DCI having a same length as the DCI. In specific implementation, when the base station determines that there is no DCI having a same length as the DCI, the field may also be omitted, that is, the resource allocation header field is not required. To be specific, the information about the allocated frequency domain resources may be preconfigured, that is, it is preconfigured that the frequency domain resources allocated to the terminal device are all the frequency domain resources that can be allocated by the base station. For example, the frequency domain resources allocated to the terminal device may be preconfigured by using a correspondence binding a format of the control information and the allocated frequency domain resources. In this way, resources occupied when the resource allocation information is indicated in the DCI can be further reduced.

In a second possible implementation provided in this embodiment of this application, DCI sent by a base station includes identifiers of time-frequency resources allocated to a terminal device, and the identifier is used to indicate information about a change of the allocated time-frequency resources relative to valid time-frequency resources obtained by the terminal device. This implementation is applicable to a case in which the base station schedules same or related resources a plurality of consecutive times, for example, a scenario in which same data needs to be sent a plurality of consecutive times to a user in ultra-reliable and low latency communication (Ultra reliable and low latency communication, URLLC), to improve reliability.

Figures 4, 5, 6A, 6B:
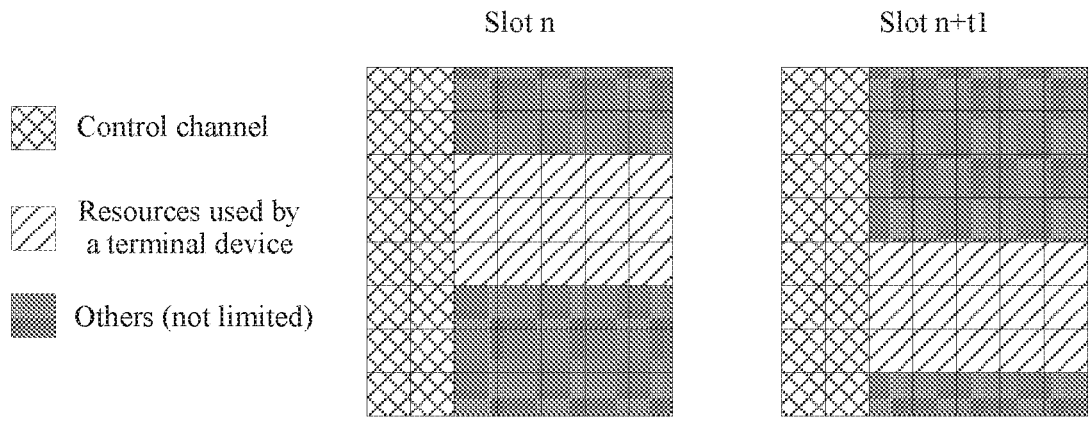
FIG. 4 is another schematic diagram of a distribution structure of allocated time-frequency resources according to an embodiment of this application.
FIG. 5 shows another table of correspondence between each resource allocation-related field in DCI sent by a base station to a terminal device and a corresponding bit length.
FIG. 6(a) shows an implementation in which an RV field is reused to indicate an offset.
FIG. 6(b) shows an implementation in which a HARQ process number field is reused to indicate an offset.

For example, in a time-frequency resource allocation diagram shown in FIG. 4, time-frequency resources allocated to the terminal device in a slot n are related to time-frequency resources allocated to the terminal device in a slot n+t1, that is, there is an offset of two RBs relative to the slot n, where n and t1 are respectively positive integers and indicate specific slot information. In this case, in a resource allocation header field in the DCI sent by the base station in the slot n+t1, 1 bit may be used to indicate identifiers of time-frequency resources allocated to the terminal device this time, and the identifier is used to indicate that the allocated time-frequency resources are related to valid time-frequency resources obtained by the terminal device. Another field is used to indicate an offset of the time-frequency resources allocated to the terminal device this time relative to the time-frequency resources allocated last time. In this way, information about the time-frequency resources allocated to the terminal device can be indicated by using fewer time-frequency resources.

Information about the valid time-frequency resources obtained by the terminal device may be information about latest valid time-frequency resources obtained by the terminal device. For example, the information about the valid time-frequency resources obtained by the terminal device may be time-frequency resource information indicated in the DCI sent by the base station and received by the terminal device last time.

In FIG. 4, a horizontal axis direction represents a time domain resource, and a vertical axis direction represents a frequency domain resource. One square in the horizontal axis direction represents a time domain resource corresponding to one symbol, and all squares in the vertical axis direction corresponding to one symbol represent all frequency domain resources corresponding to the symbol. One square in the vertical axis direction represents one RB resource.

Based on the resource allocation type shown in FIG. 4, a resource allocation-related field included in the DCI sent by the base station to the terminal device may be shown in FIG. 5.

In FIG. 5, the resource allocation header field occupies 1 bit to indicate identifiers of time-frequency resources allocated to the terminal device. The identifier is used to indicate that time-frequency resources allocated this time are related to obtained valid time-frequency resources, that is, the time-frequency resources allocated this time have an offset with the obtained valid time-frequency resources. An offset field occupies 2 bits to indicate an allocated offset, and the offset is used to indicate an offset value of the time-frequency resources allocated this time relative to the obtained valid time-frequency resources. That the offset field occupies 2 bits is merely an example. In specific implementation, the offset field may occupy 1 bit, or may occupy 3 bits or the like. The offset field falls within the protection scope of this embodiment of this application, provided that the offset field can indicate specific offset information.

It should be noted that an offset direction may be predefined in a system, and the base station and the terminal device can determine, based on a predefined direction, an offset direction of the allocated time-frequency resources relative to the obtained valid time-frequency resources. For example, it may be predefined that the offset direction may be a direction in which an RB number decreases or may be a direction in which an RB number increases.

In FIG. 5, fields in the DCI that are used to indicate resource allocation-related information occupies 3 (1+2) bits that are less than the foregoing 13 or 9 bits, and therefore resources occupied by the resource allocation information are reduced. In addition, a time required for generating the control information is correspondingly shortened, thereby improving efficiency. Correspondingly, when the terminal device obtains the control information, because bits occupied by the control information are reduced, a time required for parsing the control information is correspondingly shortened, thereby improving efficiency.

In an optional implementation, the offset may be a predefined offset, or may be notified to the terminal device through higher layer signaling. In this case, the DCI may not include the offset field. In this way, 1 bit may be used in the DCI to indicate identifiers of allocated time-frequency resources.

In this embodiment of this application, the higher layer signaling includes but is not limited to a MAC-CE or RRC.

Optionally, in a scenario in which different versions of same data are sent to a URLLC user a plurality of consecutive times to improve reliability, the DCI may not include the offset, and instead, an existing field in the DCI is reused to indicate the offset. To be specific, the offset may be indicated by using the existing field in the DCI, for example, a HARQ process number field, a new data indication field, or a redundancy version RV field.

For example, the offset may be indicated by using an RV, or the offset may be indicated by using f(RV). When the offset is indicated by using the RV, the offset is a value of the RV. For example, if RV=1, there is an offset of one RB; and if RV=2, there is an offset of two RBs. When the offset is indicated by using f(RV), the offset is a function f( ) of the RV, for example, f(x)=2x. In this case, M=2*RV. When RV=1, there is an offset of two RBs.

For example, FIG. 6(a) shows an implementation in which an RV field is reused to indicate an offset, FIG. 6(b) shows an implementation in which a HARQ process number field is reused to indicate an offset, and FIG. 6(c) shows an implementation in which a new data indication field is reused to indicate an offset. It should be noted that the reused field further has a function of the reused field, and in addition to the function of the reused field, the reused field further a function of indicating an offset of the terminal device. In addition to information carried in the RV field in FIG. 6(a), the RV field can indicate a specific offset of the terminal device.

Optionally, the offset may also be carried by using a beam number field. For example, an offset of a beam whose number is 1 is one RB, and an offset of a beam whose number is 2 is two RBs. It should be noted that the beam herein is not a physical beam, but a logical beam.

Optionally, in FIG. 5. FIG. 6(a), FIG. 6(b), or FIG. 6(c), the resource allocation header field occupies 1 bit to indicate the identifier of the allocated time-frequency resources, and the identifier is used to indicate that the time-frequency resources allocated to the terminal device this time are related to the obtained valid time-frequency resources, to distinguish the DCI from other DCI having a same length as the DCI. In specific implementation, when the base station determines that there is no DCI having a same length as the DCI, the field may also be omitted, that is, the resource allocation header field is not required. In this way, resources occupied when the resource allocation information is indicated in the DCI can be further reduced.

Correspondingly, the terminal device may learn, based on the resource allocation header field in the received DCI, that the allocated time-frequency resources are related to the obtained valid time-frequency resources, and may obtain, based on the obtained offset, the information about the time-frequency resources allocated by the base station.

In a third possible implementation provided in this embodiment of this application, DCI sent by a base station includes an identifier of allocated time-frequency resources, and the identifier is used to indicate that the time-frequency resources allocated to a terminal device are the same as time-frequency resources obtained by the terminal device. This implementation is applicable to a case in which the base station schedules same resources a plurality of consecutive times, for example, a scenario in which same data needs to be sent to a URLLC user a plurality of consecutive times to improve reliability.

For example, in a time-frequency resource allocation diagram shown in FIG. 7, time-frequency resources allocated to the terminal device in a slot n are the same as time-frequency resources allocated to the terminal device in a slot n+t1, where n and t1 are respectively positive integers and indicate specific slot information. In this case, in the DCI sent by the base station in the slot n+t1, 1 bit may be used to indicate identifiers of time-frequency resources allocated to the terminal device, and the identifier is used to indicate that the time-frequency resources allocated this time are the same as valid time-frequency resources allocated last time. In this way, time-frequency resources occupied by resource allocation information in the DCI can be greatly reduced. In addition, because bits occupied by the control information are reduced, a time required for generating the control information is correspondingly shortened, thereby improving efficiency. Correspondingly, when the terminal device obtains the control information, because bits occupied by the control information are reduced, a time required for parsing the control information is correspondingly shortened, thereby improving efficiency.

In FIG. 7, a horizontal axis direction represents a time domain resource, and a vertical axis direction represents a frequency domain resource. One square in the horizontal axis direction represents a time domain resource corresponding to one symbol, and all squares in the vertical axis direction corresponding to one symbol represent all frequency domain resources corresponding to the symbol. The resource allocation type shown in FIG. 7 is used as an example, and a resource allocation-related field included in the DCI sent by the base station to the terminal device may be shown in FIG. 8. In this way, the terminal device may obtain the information about the allocated time-frequency resources based on the resource allocation header field in the received DCI, that is, the allocated time-frequency resources are the same as the obtained time-frequency resources.

Optionally, in FIG. 8, the resource allocation header field occupies 1 bit to indicate the identifier of the time-frequency resources allocated to the terminal device, to distinguish the DCI from other DCI having a same length as the DCI. In specific implementation, when the base station determines that there is no DCI having a same length as the DCI, the field may also be omitted, that is, the resource allocation header field is not required. In this way, resources occupied when the resource allocation information is indicated in the DCI can be further reduced. For example, the information about the allocated time-frequency resources may be preconfigured, that is, information about a change of the time-frequency resources allocated to the terminal device relative to the valid time-frequency resources obtained by the terminal device may be preconfigured. Optionally, the time-frequency resources allocated to the terminal device may be preconfigured by using a correspondence binding a format of the control information and the information about the change of the allocated time-frequency resources relative to the valid time-frequency resources obtained by the terminal device.

In the first, second, and third implementations, a resource allocation type used by the base station is preconfigured or preset. For example, the first, second, and third resource allocation types are preconfigured between the base station and the terminal device. After allocating resources to the terminal device by using a scheduling algorithm, the base station sends information about the allocated resources to the terminal device by using the DCI. In this case, the base station may use the first, second, and third resource allocation types. To be specific, when the base station needs to send the DCI to the terminal device, the base station may select one of the three resource allocation types according to a specific implementation situation, and generate and send the DCI to the terminal device. After receiving the DCI sent by the base station, the terminal device can also obtain, based on the three preconfigured resource allocation types and with reference to content recorded in the resource allocation-related field in the obtained DCI, the information about the resources allocated by the base station.

FIG. 9 is a schematic diagram of a basic structure of a communications device 100 according to an embodiment of this application. As shown in FIG. 9, the communications device 100 includes a control information generation unit 102. The control information generation unit 102 is configured to generate control information such as DCI based on a result of resource scheduling performed by the communications device 100. The control information includes information about resources allocated to a terminal device. In an implementation, the communications device 100 may be a chip, such as a baseband chip or a communications chip. The control information generation unit 102 may be implemented by a circuit or a processor. In another implementation, the communications device 100 may be a network side device, such as a base station. The communications device 100 may further include a sending unit 112. The sending unit 112 is configured to send, to the terminal device, the control information generated by the control information generation unit 102. The sending unit 112 may be a transmitter, a transmit circuit, or the like. For the information that is about the resources allocated to the terminal device and that is included in the control information generated by the control information generation unit 102, refer to FIG. 2 to FIG. 7 and the descriptions related to FIG. 2 to FIG. 7. Details are not described again.

Because the communications device 100 indicates resource allocation information by using an identifier in the control information (for example, the DCI), and the identifier occupies a small quantity of bits, time-frequency resources occupied by the resource allocation information in the control information can be reduced.

Figure 10:
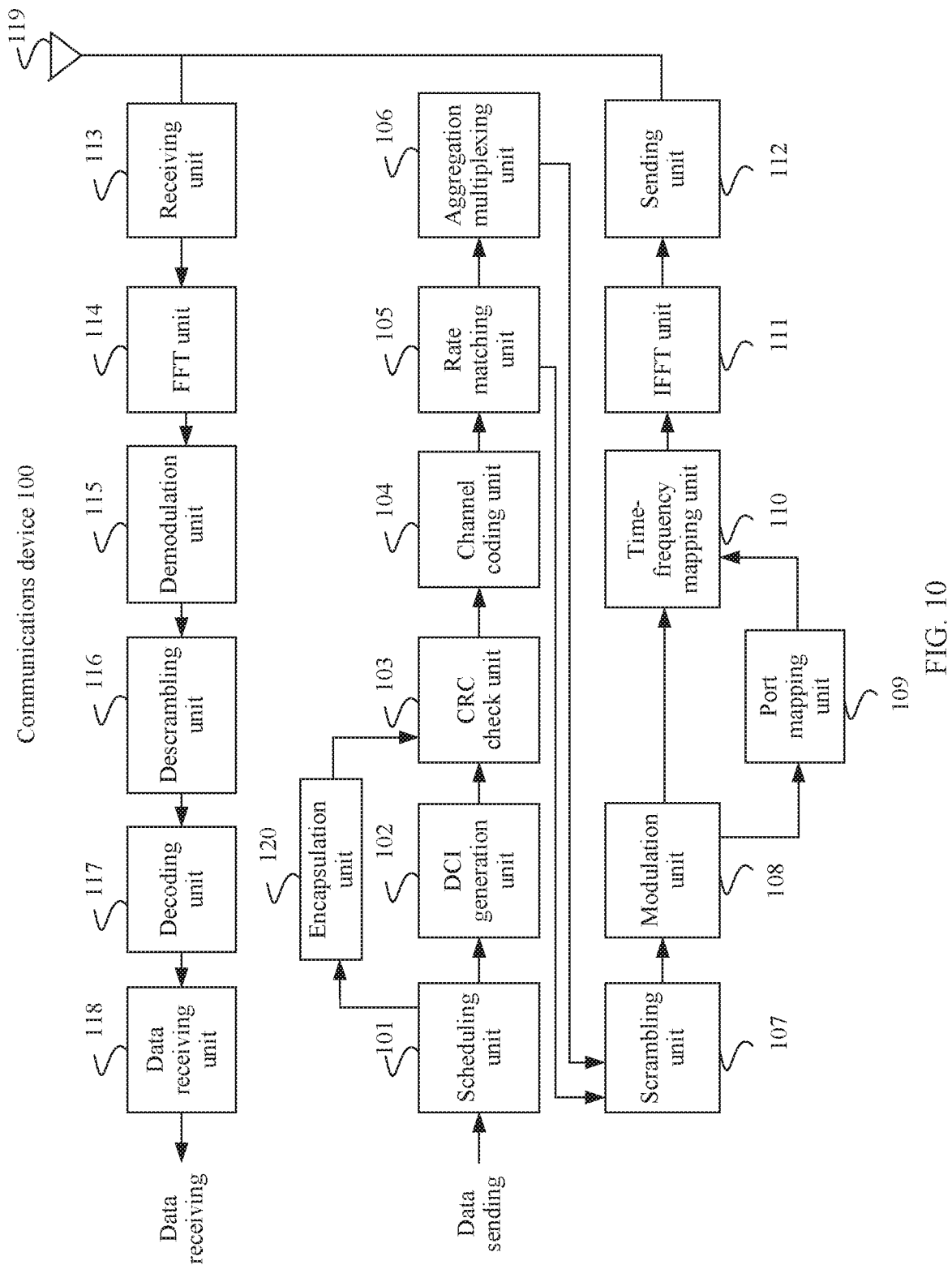
FIG. 10 is a schematic structural diagram of a communications device 100 according to an embodiment of this application.

FIG. 10 is a schematic structural diagram of a communications device 100 according to an embodiment of this application. In FIG. 10, the communications device 100 may optionally include the following parts: a scheduling unit 101, a DCI generation unit 102, an encapsulation unit 120, a CRC check unit 103, a channel coding unit 104, a rate matching unit 105, an aggregation multiplexing unit 106, a scrambling unit 107, a modulation unit 108, a port mapping unit 109, a time-frequency mapping unit 110, an IFFT unit 111, a sending unit 112, a receiving unit 113, a fast Fourier transform (fast Fourier Transform, FFT) unit 114, a demodulation unit 115, a descrambling unit 116, a decoding unit 117, a data receiving unit 118, and an antenna 119. It may be understood that each logical unit in FIG. 10 may be separately designed, or one or more logical units may be integrated together.

It should be noted that the communications device 100 may include one or more memories and processors configured to implement functions of the base station in FIG. 2 to FIG. 7. A memory and/or a processor may be separately disposed in each unit in FIG. 10; or two or more units may use a same memory and/or processor. The communications device 100 may be a chip, or may be a base station device. This is not limited in the present invention. The scheduling unit 101 is configured to schedule a resource based on a channel condition of a terminal device, a size of data that needs to be transmitted by the terminal device, and the like. A scheduling result includes specific time-frequency resources allocated to the terminal device, a modulation scheme and a bit rate used to send data, a transmission mode used to send data, a specific antenna port used to send data, and the like.

The DCI generation unit 102 is configured to generate DCI based on the result of scheduling performed by the scheduling unit 101. The generated DCI includes information such as time-frequency resources, a modulation scheme, and a bit rate that are allocated to the terminal device. A field that is in the DCI generated by the DCI generation unit 102 and that is used to indicate allocated frequency domain resources and/or time domain resources may be implemented with reference to the manners of indicating information about allocated resources in the implementations described in FIG. 2, FIG. 4, and FIG. 7. In this way, time-frequency resources occupied because the communications device 100 indicates information about allocated resources in the DCI can be reduced, thereby improving utilization of time-frequency resources.

The encapsulation unit 120 is configured to encapsulate data scheduled by the scheduling unit 101 in a predefined format. The scheduled data is data that needs to be sent to the terminal device.

The CRC check unit 103 is configured to add CRC check bits to the DCI generated by the DCI generation unit 102, or add CRC check bits to data obtained by the encapsulation unit 120 through encapsulation. Optionally, in LTE, the CRC check unit 103 adds the CRC check bits based on an ID of the terminal device, and the ID of the terminal device is usually a radio network temporary identifier (Radio Network Temporary Identifier, RNTI) of a user of the terminal device.

The channel coding unit 104 is configured to perform channel coding on DCI to which CRC check bits are added by the CRC check unit 103, or perform channel coding on data to which the CRC check bits are added by the CRC check unit 103. Channel coding provides error detection and error correction capabilities for transmitted bits, and is one of most important components of a communications system. For example, in LTE, a tail biting convolutional code (tail-biting convolutional code, TBCC) is used for channel coding for control information, and in 5G NR, a polar code is used for control information. In LTE, a turbo code is used for channel coding for data; and in the 5G NR, a low-density parity-check (Low-Density Parity-Check Code, LDPC) code is used for channel coding for data. Another coding manner may be used in a subsequent evolved system, and a specific coding method is not limited in this embodiment of this application.

The rate matching unit 105 is configured to match, to a preset PDCCH format, DCI obtained by the channel coding unit 104 through channel coding, for example, match the DCI to 72 bits, 144 bits, 288 bits, and 576 bits; or match, to a quantity of bits that can be carried on allocated resources, a quantity of bits that are of data obtained by the channel coding unit 104 through channel coding and that need to be transmitted.

The aggregation multiplexing unit 106 is configured to: aggregate, into more than one control channel element (Control channel element, CCE), quantities of bits obtained by the rate matching unit 105 through matching, and combine bit sequences corresponding to all PDCCHs in a current subframe/slot to form one bit sequence. For example, when the rate matching unit 105 matches the DCI to a PDCCH format of 72 bits, the aggregation multiplexing unit 106 aggregates the PDCCH of 72 bits into one CCE. When the rate matching unit 105 matches the DCI to a PDCCH format of 144 bits, the aggregation multiplexing unit 106 aggregates the PDCCH of the 144 bits into two CCEs, and combines a plurality of PDDCHs to generate one bit sequence.

The scrambling unit 107 is configured to perform, by using a scrambling code sequence, an addition modulo 2 operation on the bit sequence generated by the aggregation multiplexing unit 106; or perform, by using a scrambling code sequence, an addition modulo 2 operation on bits of the data obtained by the rate matching unit 105 through matching.

The modulation unit 108 is configured to modulate, into a symbol, a bit sequence obtained by the scrambling unit 107 through scrambling. For example, in LTE, a QPSK modulation scheme is used for a control channel, and the modulation unit 108 modulates 2 bits into one QPSK symbol.

The port mapping unit 109 is configured to select, according to a requirement in a protocol, an antenna port for sending the symbol obtained by the modulation unit 108 through modulation. There may be different choices for the protocol based on a specific implementation scenario. For example, the antenna port may be selected according to an LTE protocol.

Optionally, a precoding unit (not shown in the figure) may be further included, and selects a precoding matrix for sending the symbol obtained by the modulation unit 108 through modulation. For example, the precoding unit may select the precoding matrix according to a standard protocol.

The time-frequency mapping unit 110 is configured to map the symbol obtained by the modulation unit 108 through modulation to a time-frequency resource, for example, in LTE, map a QPSK symbol to a physical OFDM time-frequency resource.

The IFFT unit 111 is configured to modulate a symbol on a subcarrier into an OFDM waveform through IFFT, for example, modulate a QPSK/QAM symbol on the subcarrier into an OFDM waveform.

The sending unit 112 is configured to: modulate a frequency of the OFDM waveform obtained by the IFFT unit 111 through modulation, and send the OFDM waveform over a radio frequency (Radio frequency, RF) link, for example, send the OFDM waveform through the antenna 119.

The foregoing are descriptions of an implementation in which the communications device 100 sends the control information and data information. The communications device 100 may further receive, through the antenna 119, information sent by the terminal device.

When the communications device 100 receives, through the antenna 119, the information sent by the terminal device, the receiving unit 113 is configured to receive the information sent by the terminal device. The information sent by the terminal device may be control information or data.

The FFT unit 114 is configured to modulate, through FFT, the OFDM waveform received by the receiving unit 113 into a QPSK/QAM symbol.

The demodulation unit 115 is configured to demodulate, into a bit sequence, the symbol obtained by the FFT unit 114 through modulation.

The descrambling unit 116 is configured to descramble the bit sequence obtained by the demodulation unit 115 through demodulation, for example, descramble the bit sequence by using a scrambling code sequence.

The decoding unit 117 is configured to decode the bit sequence obtained by the descrambling unit 116 through descrambling, for example, perform channel decoding.

The data receiving unit 118 is configured to obtain data obtained by the decoding unit 117 through decoding.

In the DCI sent to the terminal device by the communications device 100, a field used to indicate information about allocated resources occupies a small quantity of bits, and therefore time-frequency resources occupied by the information about the allocated resources in the DCI can be effectively reduced.

Figure 11:
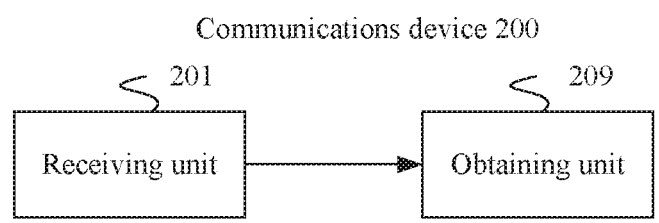
FIG. 11 is a schematic diagram of a basic structure of a communications device 200 according to an embodiment of this application.

FIG. 11 is a schematic diagram of a basic structure of a communications device 200 according to an embodiment of this application. As shown in FIG. 11, the communications device 200 includes a receiving unit 201 and an obtaining unit 209. The receiving unit 201 is configured to receive a radio signal. The obtaining unit 209 is configured to obtain, based on the radio signal received by the receiving unit 201, information that is about allocated resources and that is in the radio signal. Specifically, the radio signal received by the receiving unit 201 includes control information, and the control information includes information about allocated time-frequency resources. In an example, the receiving unit 201 may be a receiver, a receive circuit, or the like, and the obtaining unit 209 may be implemented by a processor. An implementation of the communications device 200 may be implemented with reference to the manners in which the terminal device obtains information about allocated resources in the implementations described in FIG. 2 to FIG. 7. Details are not described again.

In this way, in the control information (for example, the DCI) received by the communications device 200, a field used to indicate information about allocated time-frequency resources occupies a small quantity of bits, and therefore time-frequency resources occupied by resource allocation-related information in the control information (for example, the DCI) can be effectively reduced.

Figure 12:
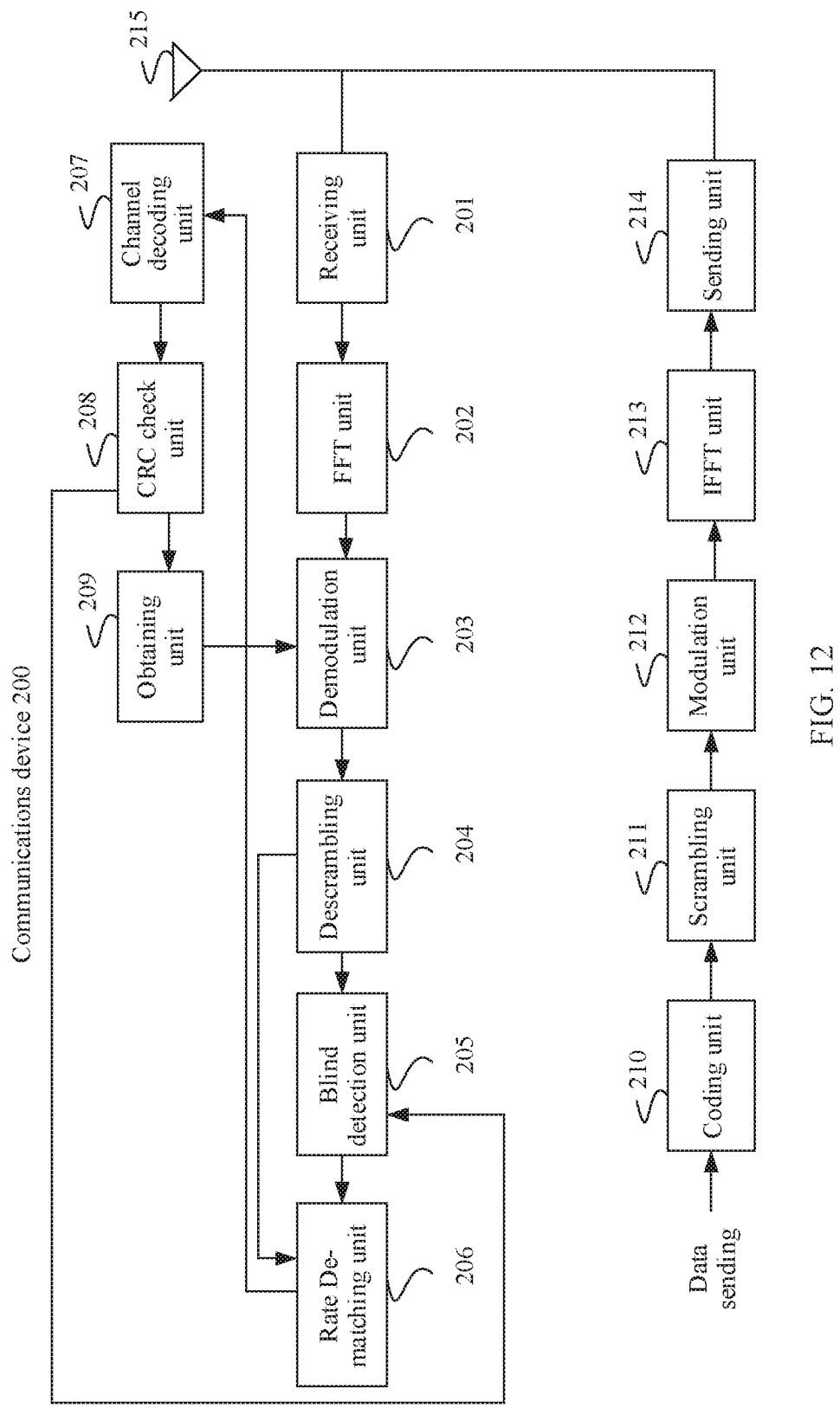
FIG. 12 is a schematic structural diagram of a communications device 200 according to an embodiment of this application.

FIG. 12 is a schematic structural diagram of a communications device 200 according to an embodiment of this application. In FIG. 12, the communications device 200 may optionally include the following parts: a receiving unit 201, an FFT unit 202, a demodulation unit 203, a descrambling unit 204, a blind detection unit 205, a rate de-matching unit 206, a channel decoding unit 207, a CRC check unit 208, an obtaining unit 209, a coding unit 210, a scrambling unit 211, a modulation unit 212, an IFFT unit 213, a sending unit 214, and an antenna 215. The receiving unit 201 is configured to monitor a control channel in a subframe or a slot to receive a radio signal sent by a base station. The signal received by the receiving unit 201 may be a radio signal carried in an OFDM waveform, that is, an OFDM time domain signal.

The FFT unit 202 is configured to perform FFT processing on the first {1, 2, 3} symbols of the monitored radio signal. For example, the FFT unit 202 may convert an OFDM symbol into a QPSK symbol to obtain a symbol sequence of the control channel.

The demodulation unit 203 is configured to demodulate, into a bit sequence, the symbol sequence obtained by the FFT unit 202 through FFT processing. For example, the demodulation unit 203 may demodulate, into a bit sequence, a QPSK symbol sequence obtained by the FFT unit 202 through demodulation.

The descrambling unit 204 is configured to descramble the bit sequence obtained by the demodulation unit 203 through demodulation.

The blind detection unit 205 is configured to perform a blind detection on the bit sequence obtained by the descrambling unit 204 through descrambling. A specific implementation of the blind detection is not limited in this embodiment of this application.

The rate de-matching unit 206 is configured to perform rate de-matching on a candidate PDCCH obtained by the blind detection unit 205 through the blind detection.

The channel decoding unit 207 is configured to perform channel decoding on a bit sequence obtained by the rate de-matching unit 206 through rate de-matching.

The CRC check unit 208 is configured to perform a CRC check on a bit sequence obtained by the channel decoding unit 207 through channel decoding. Optionally, the CRC check unit 208 may first descramble CRC check bits by using an RNTI, and then determine, by using the CRC check bits, whether DCI can be obtained through decoding.

When the CRC check unit 208 cannot obtain the DCI through decoding, the blind detection unit 205 attempts to perform a next blind detection. If all the blind detections fail, a received subframe or slot is discarded.

When the CRC check unit 208 successfully obtains the DCI through, the obtaining unit 209 obtains, based on the obtained DCI, information that is about allocated resources and that is in the DCI. Specifically, the obtaining unit 209 may obtain the information about the allocated resources with reference to the manners in which a terminal device receives information about allocated resources in the implementations described in FIG. 2, FIG. 4, and FIG. 7.

For example, when the DCI obtained by the obtaining unit 209 uses the resource allocation types described in FIG. 2, FIG. 3(*a*), and FIG. 3(*b*), the obtaining unit 209 obtains, based on a resource allocation header field in the DCI, identifiers of frequency domain resources allocated to the terminal device this time; obtains, based on a start symbol field of a data channel, information about a start symbol of time-frequency resources allocated to the terminal device this time; and obtains, based on a symbol length field occupied by the data channel, symbol length information of the time-frequency resources allocated to the terminal device this time.

When the DCI obtained by the obtaining unit 209 uses the resource allocation types in FIG. 4, FIG. 5. FIG. 6(*a*), FIG. 6(*b*), and FIG. 6(*c*), the obtaining unit 209 obtains, based on a resource allocation header field in the DCI, identifiers of time-frequency resources allocated to the terminal device this time; and obtains, based on an offset field, an offset of the time-frequency resources allocated to the terminal device this time relative to obtained valid time-frequency resources.

When the DCI obtained by the obtaining unit 209 uses the resource allocation types in FIG. 7 and FIG. 8, the obtaining unit 209 obtains, based on a resource allocation header field in the DCI, identifiers of time-frequency resources allocated to the terminal device this time, that is, may learn that the time-frequency resources allocated this time are the same as previous time-frequency resources.

In the DCI received by the communications device 20X), a field used to indicate information about allocated time-frequency resources occupies a small quantity of bits, and therefore time-frequency resources occupied by a resource allocation-related field in the DCI can be reduced.

Further, the terminal device may obtain, based on the resource allocation information indicated in the DCI and from the time-frequency resources occupied by the data channel, data sent by the base station. The terminal device may obtain, in the following implementation from the obtained DCI, the data sent by the base station:

The demodulation unit 203 is further configured to demodulate, based on the information that is about the allocated resources and that is obtained by the obtaining unit 209, a symbol (such as a QPSK symbol or a QAM symbol) mapped to a time-frequency resource indicated by the information about the allocated resources, to obtain a demodulated bit sequence. Optionally, a demodulation scheme of the demodulation unit 203 may be a modulation scheme indicated in the DCI.

The descrambling unit 204 is further configured to descramble the bit sequence obtained by the demodulation unit 203 through demodulation.

The rate de-matching unit 206 is further configured to perform, based on the information in the obtained DCI, rate de-matching on a bit sequence obtained by the descrambling unit 204 through descrambling. To be specific, the DCI obtained by the communications device 200 further includes rate matching information for a bit sequence, and the rate de-matching unit 206 performs, based on the rate matching information, rate de-matching on the bit sequence obtained by the descrambling unit 204 through descrambling.

The channel decoding unit 207 is further configured to perform, based on the information in the obtained DCI, channel decoding on a bit sequence obtained by the rate de-matching unit 206 through matching, to obtain data. Optionally, the data obtained by the channel decoding unit 207 is data that carries CRC check information. To be specific, the DCI obtained by the communications device 200 further includes information about a coding manner, and the channel decoding unit 207 performs, in a reverse manner of the coding manner, channel decoding on the bit sequence obtained by the rate de-matching unit 206 through matching.

The CRC check unit 208 is further configured to determine, through a CRC check, whether the data obtained by the channel decoding unit 207 through decoding is correct.

The foregoing are descriptions of an implementation in which the communications device 200 receives the control information and data information sent by the base station. The communications device 200 may further send, through the antenna 215, information to the base station. The information may include the control information or data information.

When the communications device 200 sends the information to the base station through the antenna 215, the coding unit 210 is configured to code the to-be-sent information. For example, the coding unit 210 performs channel coding on the information to be sent by the communications device 200.

The scrambling unit 211 is configured to scramble information obtained by the coding unit 210 through coding.

The modulation unit 212 is configured to modulate, into a symbol, information obtained by the scrambling unit 210 through scrambling.

The IFFT unit 213 is configured to modulate, into an OFDM waveform, a symbol obtained by the modulation unit 212 through modulation.

The sending unit 214 is configured to send an OFDM waveform obtained by the IFFT unit 213 through modulation.

In the several embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of hardware plus a software functional unit.

A person skilled in the art may further understand that various illustrative logical blocks, units, and steps that are listed in the embodiments of the present invention may be implemented by using electronic hardware, computer software, or a combination thereof. Whether the functions are implemented by using hardware or software depends on particular applications and a design requirement of the entire system. A person skilled in the art may use various methods to implement the described functions for each particular application, but it should not be considered that the implementation goes beyond the scope of the embodiments of the present invention.

The various illustrative logical units and circuits described in the embodiments of the present invention may implement or operate the described functions by using a general purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general purpose processor may be a microprocessor. Optionally, the general purpose processor may also be any conventional processor, controller, microcontroller, or state machine. The processor may also be implemented by a combination of computing apparatuses, such as a digital signal processor and a microprocessor, a plurality of microprocessors, one or more microprocessors with a digital signal processor core, or any other similar configuration.

Steps of the methods or algorithms described in the embodiments of the present invention may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may connect to a processor so that the processor may read information from the storage medium and write information to the storage medium. Optionally, the storage medium may be integrated into a processor. The processor and the storage medium may be arranged in an ASIC, and the ASIC may be arranged in a base station or terminal device. Optionally, the processor and the storage medium may be arranged in different components of the base station or terminal device.

With descriptions of the foregoing embodiments, a person skilled in the art may clearly understand that the present invention may be implemented by hardware, firmware or a combination thereof. When the present invention is implemented by software, the foregoing functions may be stored in a computer readable medium or transmitted as one or more instructions or code in the computer readable medium. The computer readable medium includes a computer storage medium and a communications medium, where the communications medium includes any medium that enables a computer program to be transmitted from one place to another. The storage medium may be any available medium accessible to a computer. The following provides an example but does not impose a limitation: The computer readable medium may include a RAM, a ROM, an EEPROM, a CD-ROM or another optical disc storage, or a disk storage medium or another magnetic storage device, or any other medium that can carry or store expected program code in a form of an instruction or a data structure and can be accessed by a computer. In addition, any connection may be appropriately defined as a computer readable medium.

For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk (Disk) and disc (disc) used by the present invention includes a compact disc (CD), a laser disc, an optical disc, a digital versatile disc (DVD), a floppy disk and a Blu-ray disc, where the disk usually copies data by a magnetic means, and the disc copies data optically by a laser means. The foregoing combination should also be included in the protection scope of the computer readable medium.

The foregoing descriptions are merely specific implementations of the present invention, but are not intended to limit the protection scope of the present invention. Any equivalent modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A communication method, wherein the method comprises:
   allocating communication resources to a terminal device; and
   sending control information to the terminal device, wherein the control information comprises a resource identifier, and wherein the resource identifier indicates that allocated frequency domain resources are all frequency domain resources that can be supported by the terminal device on one carrier or that some of all frequency domain resources that can be supported by the terminal device on one carrier.

2. The method according to claim 1, wherein the control information comprises a resource block allocation field, and wherein the resource block allocation field indicates identifiers of some frequency domain resources allocated to the terminal device.

3. The method according to claim 1, wherein the method further comprises:
   determining a time domain resource indication value, wherein:
      when $(L_s-1)$ is less than or equal to $\lceil N_{symb}^{DL}/2 \rceil$, the time domain resource indication value meets $\lceil N_{symb}^{DL} \times (L_s-1)+S_{start}$, wherein $L_S$ is a length of allocated time domain resources, wherein $S_{start}$ is a start symbol of the allocated time domain resources, wherein $N\lceil N_{symb}^{DL}$ is a quantity of symbols in one slot, wherein $L_s$ is greater than or equal to 1, and wherein $L_s$, is less than or equal to $(\lceil N_{symb}^{DL}-S_{start}$; or
      when $(L_s-1)$ is greater than $\lceil N_{symb}^{DL}/2 \rceil$, the time domain resource indication value meets $N_{symb}^{DL} \times (N_{symb}^{DL}-L_s+1)+(N_{symb}^{DL}-1-S_{start})$; and
   sending, to the terminal device, information indicating the time domain resource indication value.

4. The method according to claim 1, wherein the method further comprises:
   determining a time domain resource indication value, wherein:
      when $(L_s-1)$ is less than or equal to 7, the time domain resource indication value meets $14 \times (L_s-1)+S_{start}$, wherein $L_s$ is a length of allocated time domain resources, wherein $S_{start}$ is a start symbol of the allocated time domain resources, wherein $L_s$ is greater than or equal to 1, and wherein $L_s$ is less than or equal to $(14-S_{start})$; or
      when $(L_s-1)$ is greater than 7, the time domain resource indication value meets $14 \times (14-L_s+1)+(14-1-S_{start})$; and
   sending, to the terminal device, information indicating the time domain resource indication value.

5. The method according to claim 3, wherein the sending, to the terminal device, information indicating the time domain resource indication value comprises:
   sending, to the terminal device by using the control information, the information indicating the time domain resource indication value.

6. A communication method, comprising:
   receiving control information sent by a base station, wherein the control information comprises a resource identifier, and wherein the resource identifier indicates that allocated frequency domain resources are all frequency domain resources that can be supported by a terminal device on one carrier or that some of all frequency domain resources that can be supported by the terminal device on one carrier; and
   obtaining information about the allocated frequency domain resources based on the resource identifier.

7. The method according to claim 6, wherein the resource identifier is indicated by a resource allocation header field in the control information, and wherein the method further comprises:
   obtaining the resource identifier based on the resource allocation header field.

8. The method according to claim 6, wherein the method further comprises:
   receiving a time domain resource indication value, wherein:
      when $(L_s-1)$ is less than or equal $\lceil N_{symb}^{DL}/2 \rceil$, the time domain resource indication value meets $N_{symb}^{DL} \times L_s-1)+S_{start}$, wherein $L_s$ is a length of allocated time domain resources, wherein $S_{start}$ is a start symbol of the allocated time domain resources, wherein $N_{symb}^{DL}$, is a quantity of symbols in one slot, wherein $L_s$ is greater than or equal to 1, and wherein $L_s$ is less than or equal to $(N_{symb}^{DL}-S_{start})$; or
      when $(L_s-1)$ is greater than $\lceil N_{symb}^{DL}/2 \rceil$, the time domain resource indication value meets $N_{symb}^{DL} \times (N_{symb}^{DL}-L_s+1)+(N_{symb}^{DL}-1-S_{start})$.

9. The method according to claim 6, wherein the method further comprises:
   receiving a time domain resource indication value; wherein:
      when $(L_s-1)$ is less than or equal to 7, the time domain resource indication value meets $14 \times (L_s-1)+S_{start}$, wherein $L_s$ is a length of allocated time domain resources; wherein $S_{start}$ is a start symbol of the allocated time domain resources, wherein $L_s$ is greater than or equal to 1, and wherein $L_s$ is less than or equal to $(14-S_{start})$; or
      when $(L_s-1)$ is greater than 7, the time domain resource indication value meets $14 \times (14-L_s+1)+(14-1-S_{start})$.

10. The method according to claim 8, wherein information indicating the time domain resource indication value is obtained by using the control information.

11. A communication device, wherein the communication device comprises:

at least one processor, the at least one processor configured to allocate communication resources to a terminal device; and a transmitter, the transmitter configured to send control information to the terminal device, wherein the control information comprises a resource identifier, and wherein the resource identifier indicates that allocated frequency domain resources are all frequency domain resources that can be supported by the terminal device on one carrier or that some of all frequency domain resources that can be supported by the terminal device on one carrier.

12. The communication device according to claim 11, wherein the control information comprises a resource block allocation field, and wherein the resource block allocation field indicates identifiers of some frequency domain resources allocated to the terminal device.

13. The communication device according to claim 11, wherein the at least one processor is further configured to:
determine a time domain resource indication value; wherein:
when $(L_s-1)$ is less than or equal to $\lceil N_{symb}^{DL}/2 \rceil$, the time domain resource indication value meets $N_{symb}^{DL} \times (L_s-1)+S_{start}$, wherein $L_s$ is a length of allocated time domain resources, wherein $S_{start}$ is a start symbol of the allocated time domain resources, wherein $N_{symb}^{DL}$ is a quantity of symbols in one slot, wherein $L_s$ is greater than or equal to 1, and wherein $L_s$ is less than or equal to $(N_{symb}^{DL}-S_{start})$; or
when $(L_s-1)$ is greater than $\lceil N_{symb}^{DL}/2 \rceil$, the time domain resource indication value meets $N_{symb}^{DL} \times (N_{symb}^{DL}-L_s+1)+(N_{symb}^{DL}-1-S_{start})$; and
the transmitter is further configured to send information indicating the time domain resource indication value to the terminal device.

14. The communication device according to claim 11, wherein the at east one processor is further configured to:
determine a time domain resource indication value, wherein:
when $(L_s-1)$ is less than or equal to 7, the time domain resource indication value meets $14 \times (L_s-1)+S_{start}$, wherein $L_s$ is a length of allocated time domain resources, wherein $S_{start}$ is a start symbol of the allocated time domain resources, wherein $L_s$ is greater than or equal to 1, and wherein $L_s$ is less than or equal to $(14-S_{start})$; or
when $(L_s-1)$ is greater than 7, the time domain resource indication value meets $14 \times (14-L_s+1)+(14+1+S_{start})$; and
the transmitter is further configured to send information indicating the time domain resource indication value to the terminal device.

15. The communication device according to claim 13, wherein the transmitter is further configured to:
send the information indicating the time domain resource indication value to the terminal device by using the control information.

16. A communication device, comprising:
a receiver, the receiver configured to receive control information sent by a base station, wherein the control information comprises a resource identifier, and wherein the resource identifier indicates that allocated frequency domain resources are all frequency domain resources that can be supported by a terminal device on one carrier or that some of all frequency domain resources that can be supported by the terminal device on one carrier; and
at least one processor, the at least one processor configured to obtain information about the allocated frequency domain resources based on the resource identifier.

17. The communication device according to claim 16, wherein the resource identifier is indicated by a resource allocation header field in the control information, and the at least one processor is further configured to:
obtain the resource identifier based on the resource allocation header field.

18. The communication device according to claim 16, wherein the receiver is further configured to:
receive a time domain resource indication value, wherein:
when $(L_s-1)$ is less than or equal to $\lceil N_{symb}^{DL}/2 \rceil$, the time domain resource indication value meets $N_{symb}^{DL} \times (L_s-1)+S_{start}$, wherein $L_s$ is a length of allocated time domain resources, wherein $S_{start}$ is a start symbol of the allocated time domain resources, wherein $N_{symb}^{DL}$ is a quantity of symbols in one slot, wherein $L_s$ is greater than or equal to 1, and wherein $L_s$ is less than or equal to $(N_{symb}^{DL}-S_{start})$; or
when $(L_s-1)$ is greater than $\lceil N_{symb}^{DL}/2 \rceil$, the time domain resource indication value meets $N_{symb}^{DL} \times (N_{symb}^{DL}-1) \times (N_{symb}^{DL}-1-S_{start})$.

19. The communication device according to claim 16, wherein the receiver is further configured to:
receive a time domain resource indication value, wherein:
when $(L_s-1)$ is less than or equal to 7, the time domain resource indication value meets $14 \times (L_s-1)+S_{start}$, wherein $L_s$ is a length of allocated time domain resources, wherein $S_{start}$ is a start symbol of the allocated time domain resources, wherein $L_s$ is greater than or equal to 1, and wherein $L_s$ is less than or equal to $(14-S_{start})$; or
when $(L_s-1)$ is greater than 7, the time domain resource indication value meets $14 \times (14-L_s+1)+(14-1-S_{start})$.

20. The communication device according to claim 18, wherein information indicating the time domain resource indication value is obtained by using the control information.

* * * * *